US012659915B2

(12) United States Patent
Manolakos et al.

(10) Patent No.: US 12,659,915 B2
(45) Date of Patent: Jun. 16, 2026

(54) CONFIGURATION FRAMEWORK AND POSITIONING REFERENCE SIGNAL (PRS) ASSOCIATION MECHANISMS AND TRIGGERING FOR RECONFIGURABLE INTELLIGENT SURFACE (RIS)-AIDED POSITIONING AND OBJECT SENSING

(71) Applicant: QUALCOMM Incorporated, San Diego, CA (US)

(72) Inventors: Alexandros Manolakos, Escondido, CA (US); Weimin Duan, San Diego, CA (US); Krishna Kiran Mukkavilli, San Diego, CA (US); Tingfang Ji, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 18/548,705

(22) PCT Filed: Jan. 28, 2022

(86) PCT No.: PCT/US2022/014365
§ 371 (c)(1),
(2) Date: Sep. 1, 2023

(87) PCT Pub. No.: WO2022/216351
PCT Pub. Date: Oct. 13, 2022

(65) Prior Publication Data
US 2024/0179669 A1      May 30, 2024

(30) Foreign Application Priority Data
Apr. 8, 2021    (GR) .............................. 20210100241

(51) Int. Cl.
*H04W 64/00* (2009.01)
*H04B 7/04* (2017.01)
(Continued)

(52) U.S. Cl.
CPC ........ *H04W 64/00* (2013.01); *H04B 7/04013* (2023.05); *H04L 5/0051* (2013.01); *H04W 72/231* (2023.01); *H04W 76/20* (2018.02)

(58) Field of Classification Search
CPC ..... H04W 64/00; H04W 24/08; H04W 48/10; H04W 72/23; H04W 72/231;
(Continued)

(56) References Cited

U.S. PATENT DOCUMENTS 5,689,812 A * 11/1997 Takahashi ............ H04B 17/373
703/13
7,072,612 B2      7/2006 Soliman
(Continued)

FOREIGN PATENT DOCUMENTS

JP        2005323392 A      11/2005
JP        2008193525 A      8/2008
(Continued)

OTHER PUBLICATIONS

Fraunhofer IIS., et al., "RSRP based Positioning with Assistance Data Exchange", 3GPP TSG RAN WG2 Meeting #106, R2-1907144 RSRP_Based_Positioning, 3rd Generation Partnership Project, Mobile Competence Centre, 650, Route Des Lucioles, F-06921 Sophia-Antipolis Cedex, France, vol. Ran WG2, No. Reno, US, May 13, 2019-May 17, 2019, May 2, 2019, XP051711436, 5 Pages.
(Continued)

*Primary Examiner* — Siu M Lee
(74) *Attorney, Agent, or Firm* — Thien T. Nguyen

(57) ABSTRACT
Disclosed are techniques for wireless positioning. In an aspect, a user equipment (UE) engages in a positioning
(Continued)

1200

UE

Engage in a positioning session or a sensing session      1210

Receive, from a network entity, assistance data for at least one positioning reference signal (PRS) resource transmitted by a transmission point, the assistance data including a PRS resource location field indicating a geographic location of the transmission point, the assistance data further including reflection point object (RPO) information for at least one RPO that is capable of reflecting a waveform associated with the at least one PRS resource, the RPO information including at least location information for the at least one RPO      1220 session or a sensing session and receives, from a network entity, assistance data for at least one positioning reference signal (PRS) resource transmitted by a transmission point, the assistance data including a PRS resource location field indicating a geographic location of the transmission point, the assistance data further including reflection point object (RPO) information for at least one RPO that is capable of reflecting a waveform associated with the at least one PRS resource, the RPO information including at least location information for the at least one RPO.

36 Claims, 17 Drawing Sheets

(51) Int. Cl.
    *H04L 5/00*        (2006.01)
    *H04W 72/231*    (2023.01)
    *H04W 76/20*     (2018.01)

(58) Field of Classification Search
    CPC ..... H04W 76/20; H01Q 15/14; G01S 5/0236;
                    G01S 5/0273; H04L 27/001; H04L
                27/0006; H04L 5/0048; H04L 5/0051;
              H04L 5/0053; H04B 7/04013; H04B 7/06
    See application file for complete search history.

(56) References Cited

U.S. PATENT DOCUMENTS

| | | | |
|---|---|---|---|
| 2022/0014877 A1* | 1/2022 | Stare | G01S 5/0236 |
| 2022/0113365 A1* | 4/2022 | Sosnin | G01S 5/02 |
| 2022/0247480 A1* | 8/2022 | Papadopoulos | G01S 5/0273 |
| 2023/0048739 A1* | 2/2023 | Bengtsson | H04W 16/28 |
| 2023/0258759 A1* | 8/2023 | Wang | G01S 1/0423 |
| | | | 455/456.1 |
| 2023/0421209 A1* | 12/2023 | Jiang | H04W 24/02 |
| 2024/0039608 A1* | 2/2024 | Wang | H04B 7/0695 |

FOREIGN PATENT DOCUMENTS

| | | |
|---|---|---|
| JP | 2011153997 A | 8/2011 |
| JP | 2012068070 A | 4/2012 |
| JP | 2014527737 A | 10/2014 |
| WO | WO-2004079387 A2 | 9/2004 |
| WO | 2020096506 A1 | 5/2020 |
| WO | 2021029997 A1 | 2/2021 |

OTHER PUBLICATIONS

International Search Report and Written Opinion—PCT/US2022/014365—ISA/EPO—Jun. 9, 2022.

* cited by examiner

306

390

Network Interface(s)

Positioning Component — 398

Data Bus — 392

Memory

Positioning Component

Positioning Component

Processing System

Positioning Component — 394

396    398          398          398

900

RIS1 On 910-1

904

902

RIS2 On

1000

Beam1

1010

PRS Resource 1

1020-1

PRS Resource 1

1004

1002

Option 1: RPO-ID=0
Option 2: RPO-ID=0;
        RPO-Beam-ID=0

1030 ⟍

Beam2

Option 1: RPO-ID=1
Option 2: RPO-ID=0;
          RPO-Beam-ID=1

1010

PRS Resource 1

1020-2

PRS Resource 1

1004

1002

1050 ⟍

1020-3

Option 1: RPO-ID=2
Option 2: RPO-ID=0;
          RPO-Beam-ID=2

1010

PRS Resource 1

Beam3

1004

PRS Resource 1

1002

1100

RIS1 On 1110-1

1104

RIS2 On 1110-2

1102

PRS Resource 1 – Location
- ARP-Location=TRP Location
- {RPO1-ID; RPO-Beam1-ID}
- {RPO2-ID; RPO-Beam2-ID}

1130

RIS1 Off 1110-1

1104

RIS2 On 1110-2

1102

PRS Resource 1 – Location
- ARP-Location=TRP Location
- {RPO2-ID; RPO-Beam2-ID}

1150

RIS1 On 1110-1

1104

RIS2 Off 1110-2

1102

PRS Resource 1 – Location
- ARP-Location=TRP Location
- {RPO1-ID; RPO-Beam1-ID}

1200

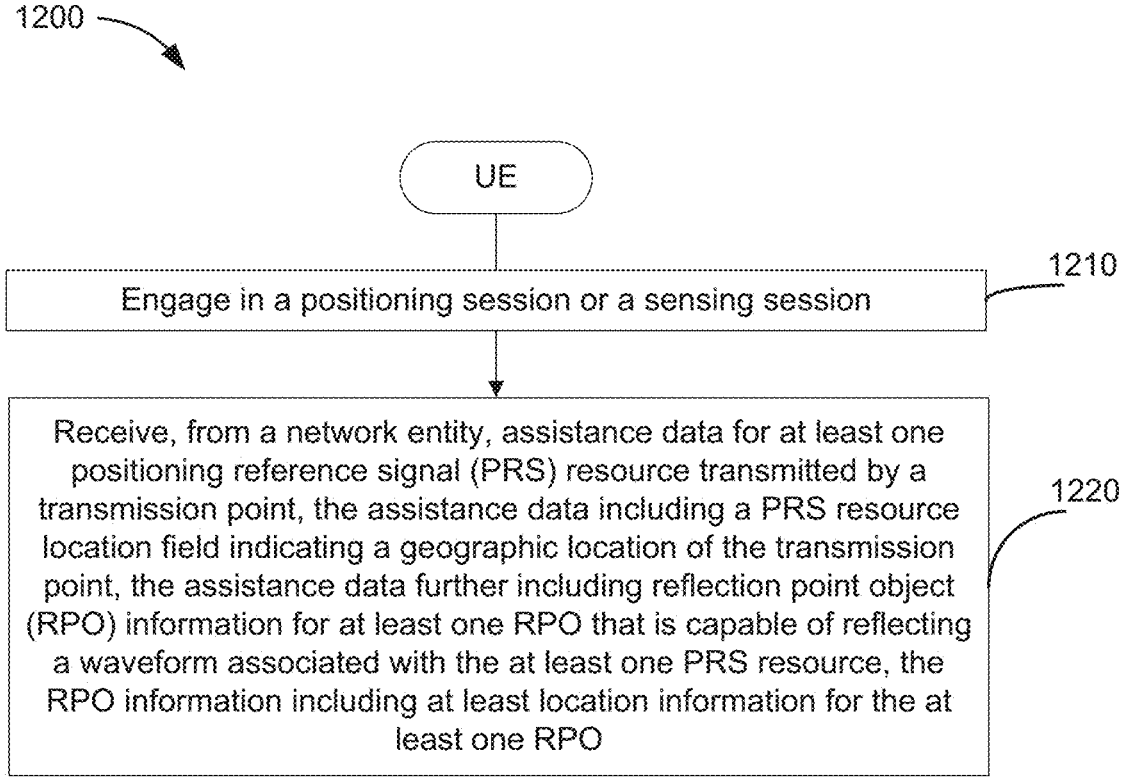

UE

Engage in a positioning session or a sensing session    1210

Receive, from a network entity, assistance data for at least one positioning reference signal (PRS) resource transmitted by a transmission point, the assistance data including a PRS resource location field indicating a geographic location of the transmission point, the assistance data further including reflection point object (RPO) information for at least one RPO that is capable of reflecting a waveform associated with the at least one PRS resource, the RPO information including at least location information for the at least one RPO    1220

Network
Entity

1310
Engage in a UE-based positioning session with a UE

1320
Determine reflection point object (RPO) information for at least one
RPO that is capable of reflecting a waveform, the RPO information
including at least location information for the at least one RPO 1330
Transmit the RPO information to the UE

CONFIGURATION FRAMEWORK AND POSITIONING REFERENCE SIGNAL (PRS) ASSOCIATION MECHANISMS AND TRIGGERING FOR RECONFIGURABLE INTELLIGENT SURFACE (RIS)-AIDED POSITIONING AND OBJECT SENSING

CROSS-REFERENCE TO RELATED APPLICATIONS

The present application for patent claims the benefit of GR Application No. 20210100241, entitled "CONFIGURATION FRAMEWORK AND POSITIONING REFERENCE SIGNAL (PRS) ASSOCIATION MECHANISMS AND TRIGGERING FOR RECONFIGURABLE INTELLIGENT SURFACE (RIS)-AIDED POSITIONING AND OBJECT SENSING", filed Apr. 8, 2021, and is a national stage application, filed under 35 U.S.C. § 371, of International Patent Application No. PCT/US2022/014365, entitled, "CONFIGURATION FRAMEWORK AND POSITIONING REFERENCE SIGNAL (PRS) ASSOCIATION MECHANISMS AND TRIGGERING FOR RECONFIGURABLE INTELLIGENT SURFACE (RIS)-AIDED POSITIONING AND OBJECT SENSING", filed Jan. 28, 2022, both of which are assigned to the assignee hereof and are expressly incorporated herein by reference in their entirety.

BACKGROUND OF THE DISCLOSURE

Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data. Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless positioning performed by a user equipment (UE) includes engaging in a positioning session or a sensing session; and receiving, from a network entity, assistance data for at least one positioning reference signal (PRS) resource transmitted by a transmission point, the assistance data including a PRS resource location field indicating a geographic location of the transmission point, the assistance data further including reflection point object (RPO) information for at least one RPO that is capable of reflecting a waveform associated with the at least one PRS resource, the RPO information including at least location information for the at least one RPO.

In an aspect, a method of wireless positioning performed by a network entity includes engaging in a positioning session or a sensing session with a user equipment (UE); determining reflection point object (RPO) information for at least one RPO that is capable of reflecting a waveform, the RPO information including at least location information for the at least one RPO; and transmitting the RPO information to the UE.

In an aspect, a user equipment (UE) includes a memory; at least one transceiver; and at least one processor communicatively coupled to the memory and the at least one transceiver, the at least one processor configured to: engage in a positioning session or a sensing session; and receive, via the at least one transceiver, from a network entity, assistance data for at least one positioning reference signal (PRS) resource transmitted by a transmission point, the assistance data including a PRS resource location field indicating a geographic location of the transmission point, the assistance data further including reflection point object (RPO) information for at least one RPO that is capable of reflecting a waveform associated with the at least one PRS resource, the RPO information including at least location information for the at least one RPO.

In an aspect, a network entity includes a memory; at least one transceiver; and at least one processor communicatively coupled to the memory and the at least one transceiver, the at least one processor configured to: engage in a positioning session or a sensing session with a user equipment (UE); determine reflection point object (RPO) information for at least one RPO that is capable of reflecting a waveform, the RPO information including at least location information for the at least one RPO; and cause the at least one transceiver to transmit the RPO information to the UE.

In an aspect, a user equipment (UE) includes means for engaging in a positioning session or a sensing session; and means for receiving, from a network entity, assistance data for at least one positioning reference signal (PRS) resource transmitted by a transmission point, the assistance data including a PRS resource location field indicating a geographic location of the transmission point, the assistance data further including reflection point object (RPO) information for at least one RPO that is capable of reflecting a waveform associated with the at least one PRS resource, the RPO information including at least location information for the at least one RPO.

In an aspect, a network entity includes means for engaging in a positioning session or a sensing session with a user equipment (UE); means for determining reflection point object (RPO) information for at least one RPO that is capable of reflecting a waveform, the RPO information including at least location information for the at least one RPO; and means for transmitting the RPO information to the UE.

In an aspect, a non-transitory computer-readable medium storing computer-executable instructions that, when executed by a user equipment (UE), cause the UE to: engage in a positioning session or a sensing session; and receive, from a network entity, assistance data for at least one positioning reference signal (PRS) resource transmitted by a transmission point, the assistance data including a PRS resource location field indicating a geographic location of the transmission point, the assistance data further including reflection point object (RPO) information for at least one RPO that is capable of reflecting a waveform associated with the at least one PRS resource, the RPO information including at least location information for the at least one RPO.

In an aspect, a non-transitory computer-readable medium storing computer-executable instructions that, when executed by a network entity, cause the network entity to: engage in a positioning session or a sensing session with a user equipment (UE); determine reflection point object (RPO) information for at least one RPO that is capable of reflecting a waveform, the RPO information including at least location information for the at least one RPO; and transmit the RPO information to the UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 12 and 13 illustrate example methods of wireless positioning, according to aspects of the disclosure.

DETAILED DESCRIPTION

Figure 1:
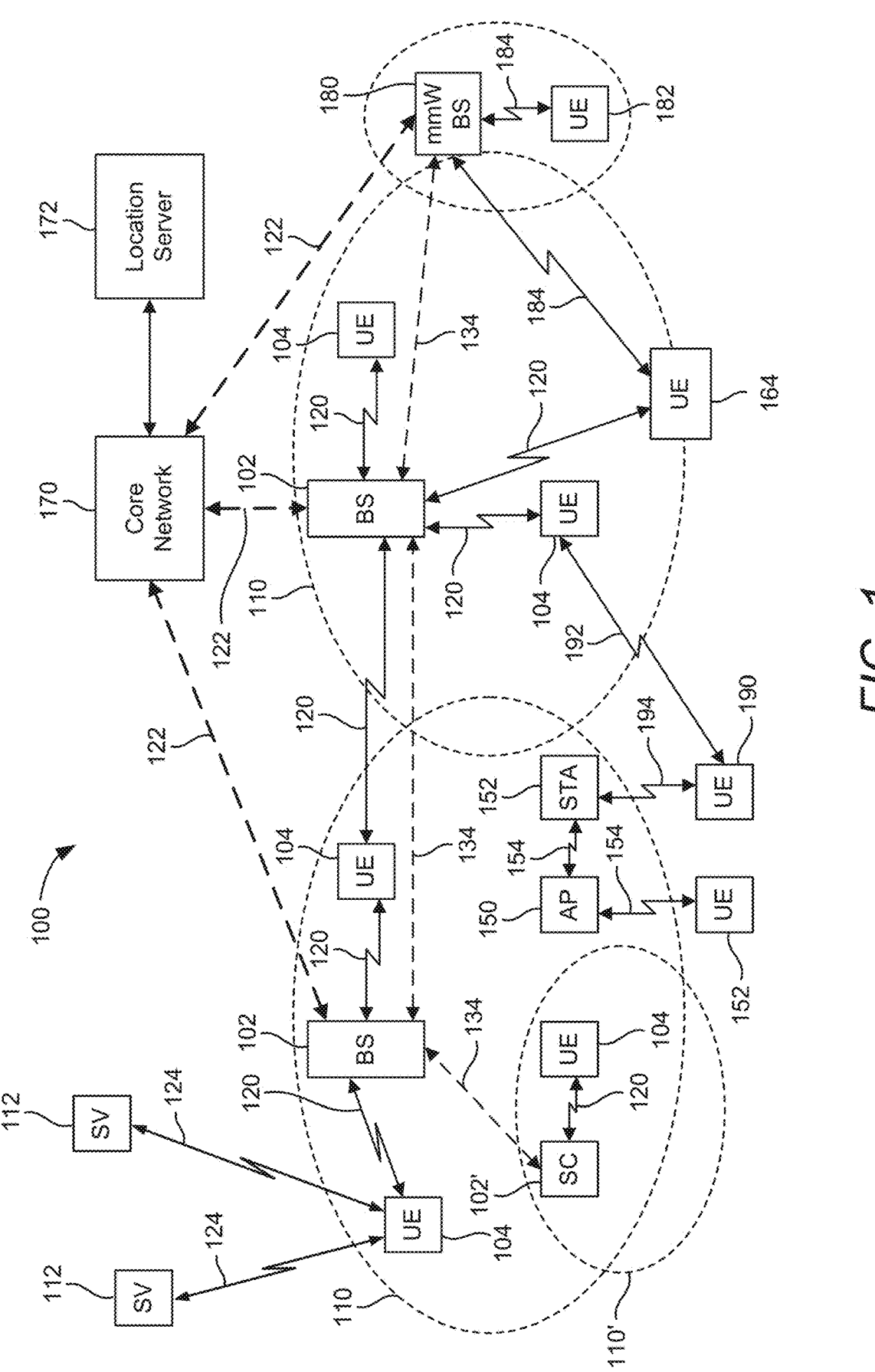
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT." a "client device." a "wireless device." a "subscriber device," a "subscriber terminal." a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mm W frequencies in communication with a UE 182. Extremely high frequency (EHF) is part of the RF in the electromagnetic spectrum.

EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHZ), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
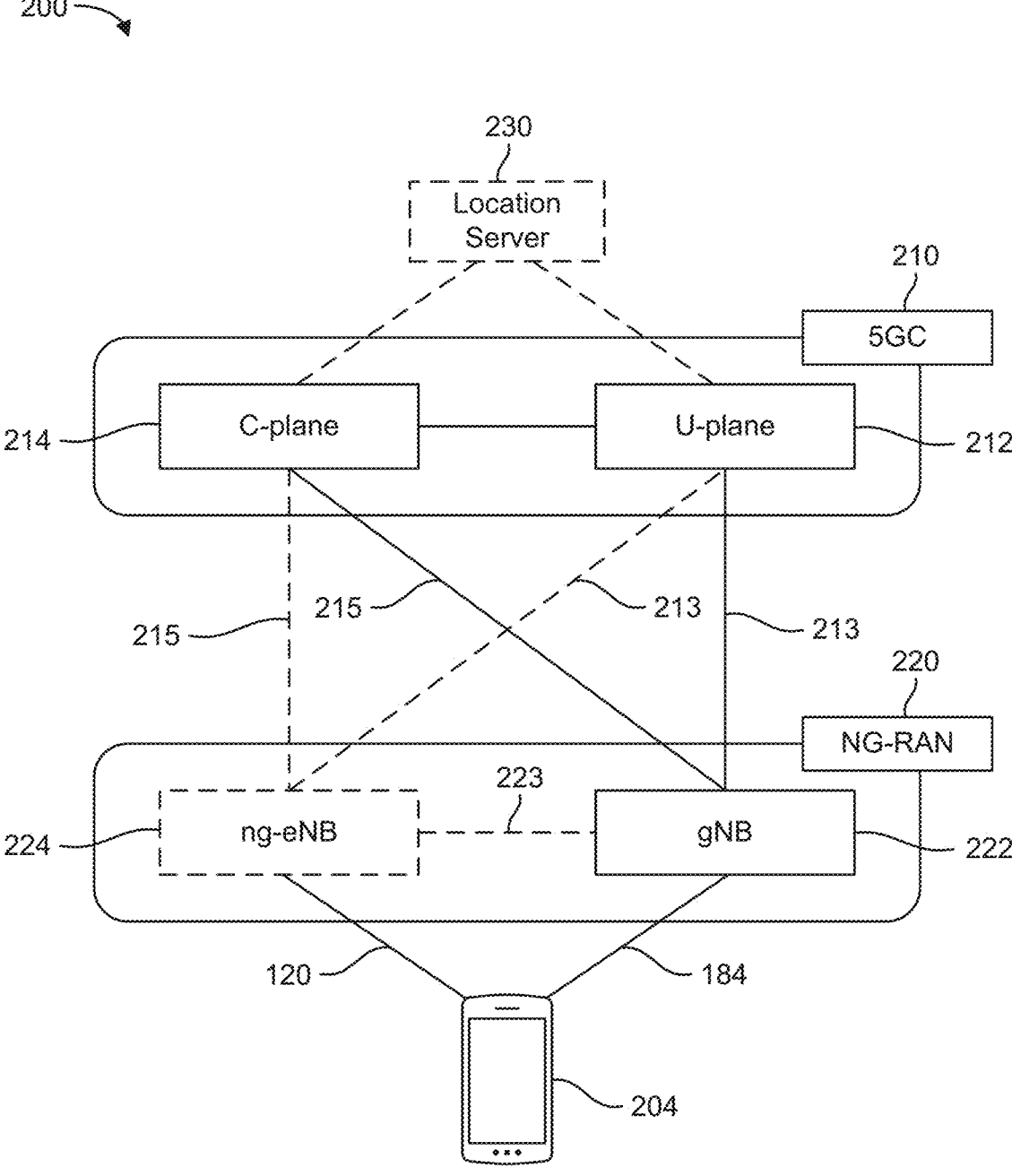
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
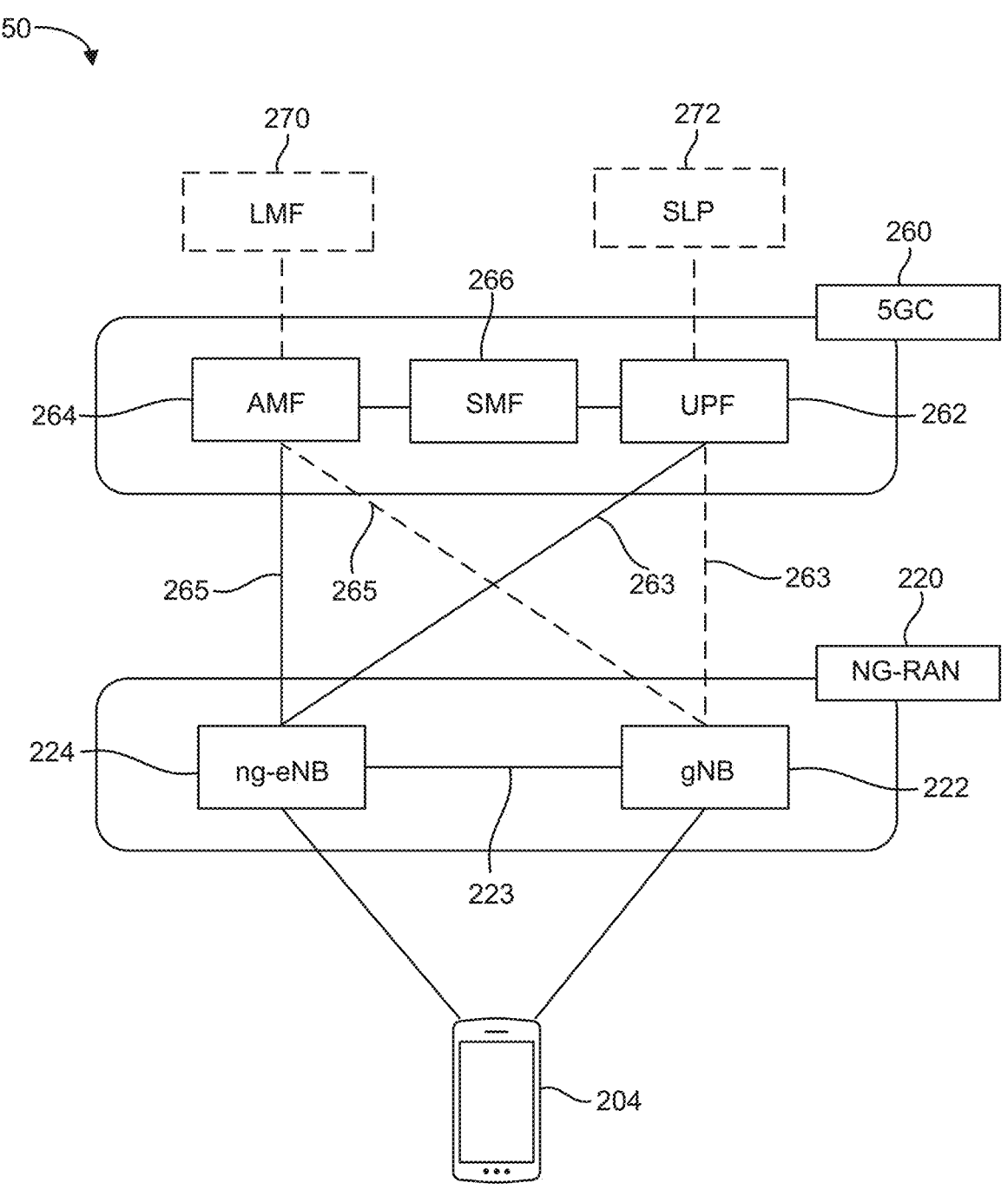

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the NG-RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the NG-RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and an LMF 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
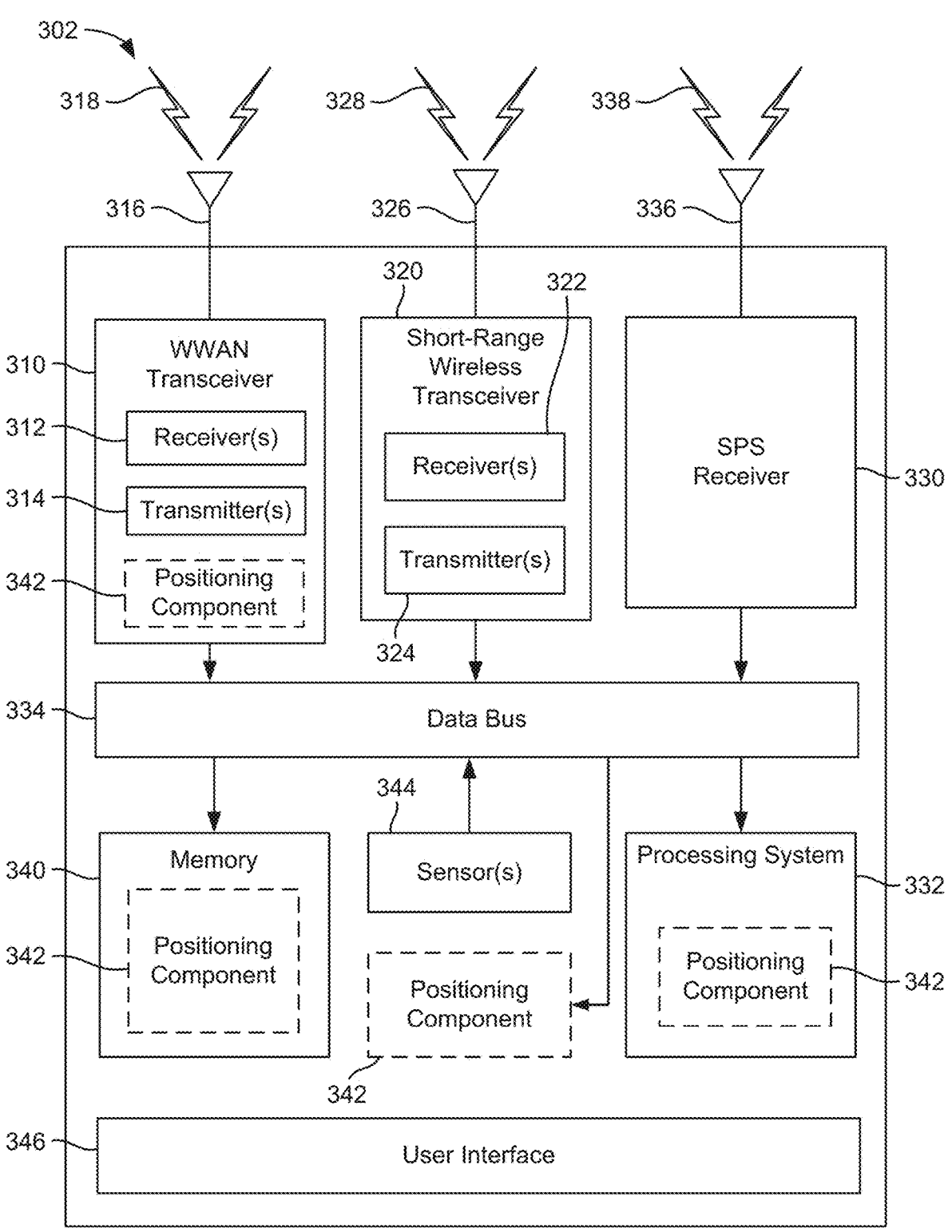
FIGS. 3A to 3C are simplified block diagrams of several sample aspects of components that may be employed in a user equipment (UE), a base station, and a network entity, respectively, and configured to support communications as taught herein.
Figure 3B:
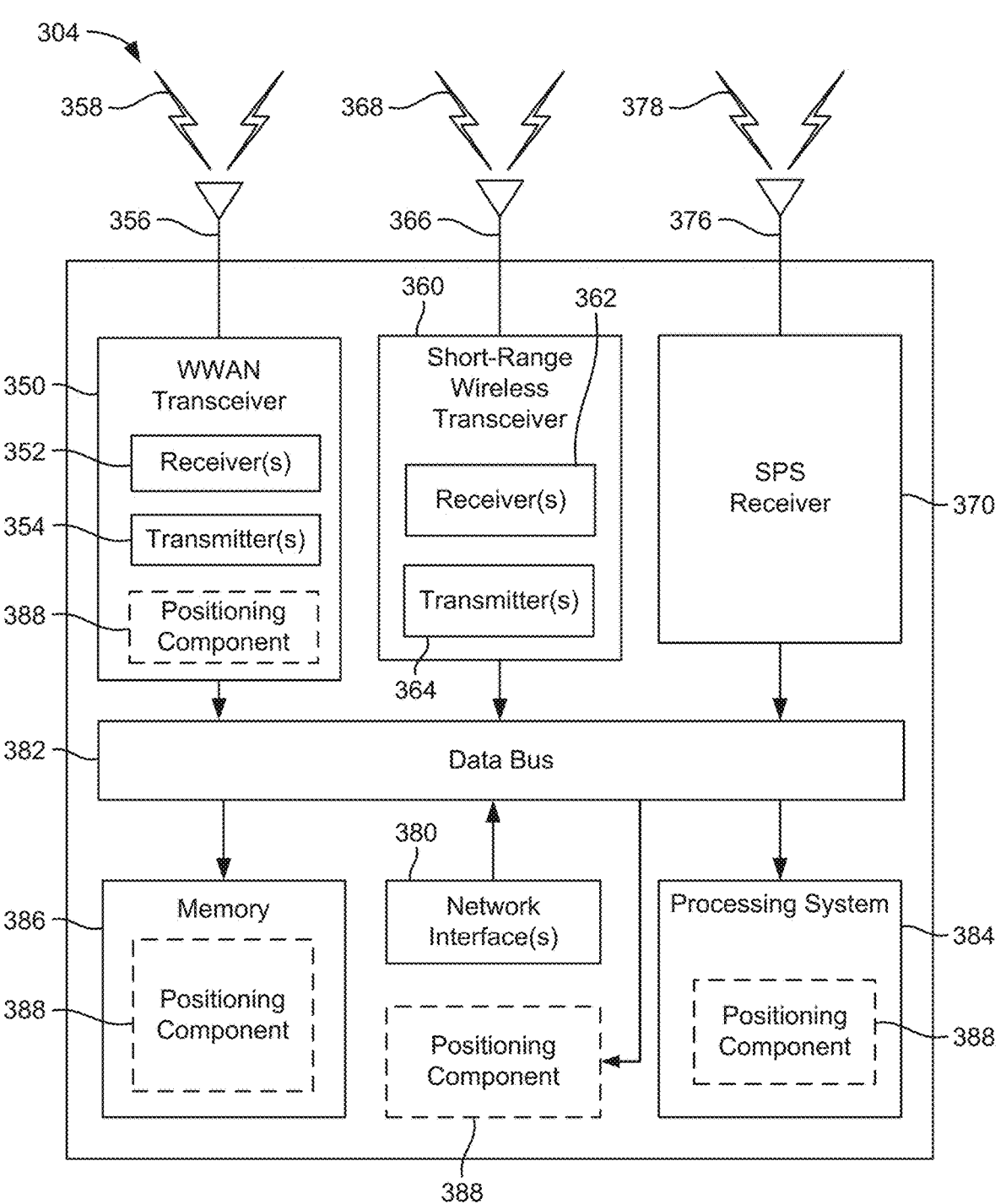
Figure 3C:
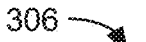

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®), Zigbee®. Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more processors, such as one or more general purpose processors, multi-core processors, ASICs, digital signal processors (DSPs), field programmable gate arrays (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the positioning component 342, which may be part of the WWAN transceiver 310, the memory component 340, the processing system 332, or any combination thereof, or may be a standalone component. FIG. 3B illustrates possible locations of the positioning component 388, which may be part of the WWAN transceiver 350, the memory component 386, the processing system 384, or any combination thereof, or may be a standalone component. FIG. 3C illustrates possible locations of the positioning component 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phaseshift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316.

The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A to 3C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A to 3C may be implemented in various ways. In some implementations, the components of FIGS. 3A to 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processing systems 332, 384, 394, the transceivers 310, 320, 350, and 360, the memory components 340, 386, and 396, the positioning components 342, 388, and 398, etc.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, a UE performs an RTT procedure with multiple base stations to enable its location to be determined (e.g., using multilateration) based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g. location server 230, LMF 270, SLP 272) may provide assistance data to the UE. For example, the assistance data may include identifiers of the base stations (or the cells/

TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.), in some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4A:
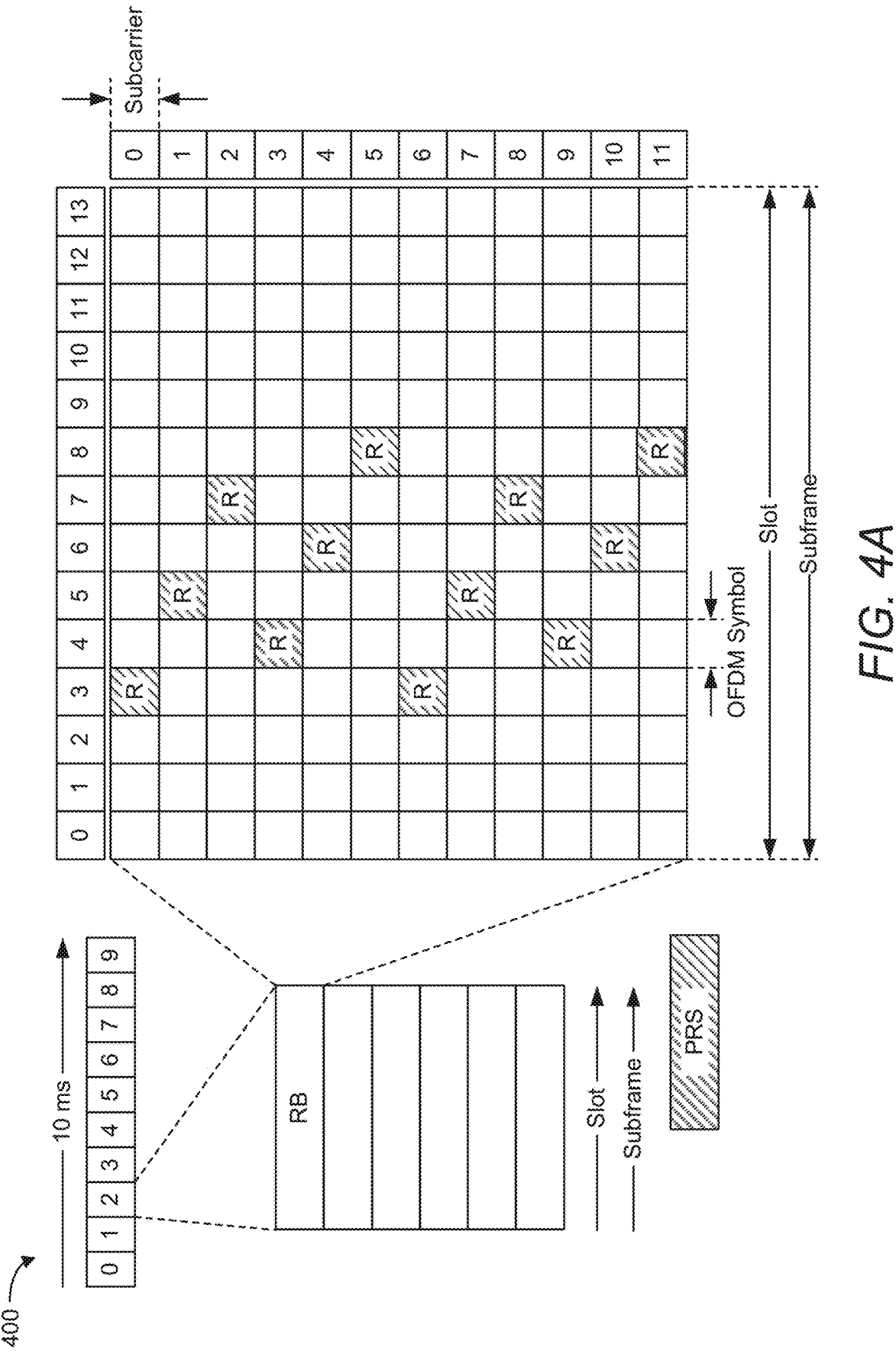
FIGS. 4A and 4B are diagrams illustrating example frame structures and channels within the frame structures, according to aspects of the disclosure.
Figure 4B:
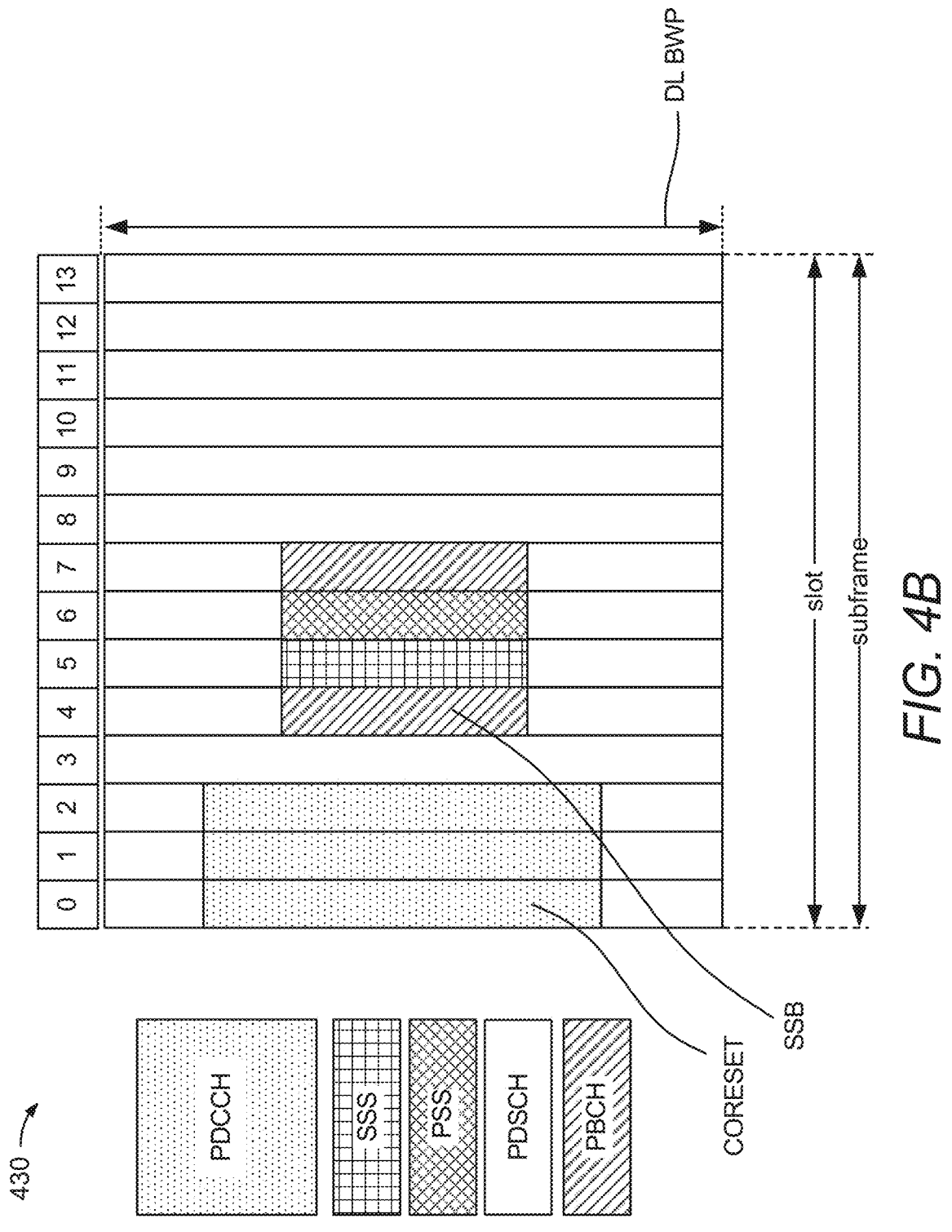

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast. NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIGS. 4A and 4B, a numerology of 15 kHz is used. Thus, in the time domain, a 10 ms frame is divided into 10 equally sized subframes of 1 ms each, and each subframe includes one time slot. In FIGS. 4A and 4B time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS. TRS. PTRS, CRS, CSI-RS, DMRS. PSS, SSS, SSB, etc. FIG. 4A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-6 (which spans six symbols). That is, the locations of the shaded REs (labeled "R") indicate a comb-6 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}: 4-symbol comb-2: {0, 1, 0, 1}: 6-symbol comb-2: {0, 1, 0, 1, 0, 1}: 12-symbol comb-2: {0, 1, 0, 1, 0, 1, 0, 1, 0, 1, 0, 1}; 4-symbol comb-4: {0, 2, 1, 3}; 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with $\mu$=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource." also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The PDSCH carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR. PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., PUSCH). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

Figure 5:
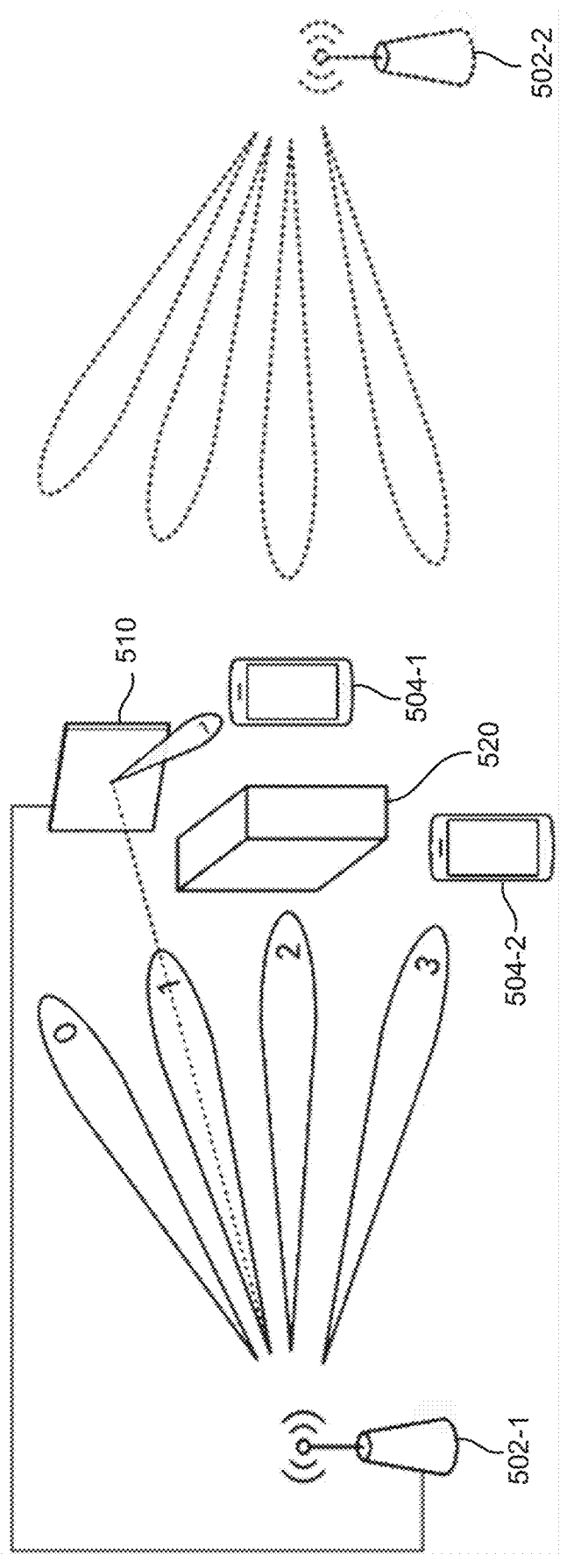
FIG. 5 illustrates an example system for wireless communication using a reconfigurable intelligent surface (RIS), according to aspects of the disclosure.

FIG. 5 illustrates an example system 500 for wireless communication using a reconfigurable intelligent surface (RIS) 510, according to aspects of the disclosure. An RIS (e.g., RIS 510) is a two-dimensional surface comprising a large number of low-cost, low-power near-passive reflecting elements whose properties are reconfigurable (by software) rather than static. For example, by carefully tuning the phase shifts of the reflecting elements (using software), the scattering, absorption, reflection, and diffraction properties of an RIS can be changed over time. In that way, the electromagnetic (EM) properties of an RIS can be engineered to collect wireless signals from a transmitter (e.g., a base station, a UE, etc.) and passively beamform them towards a target receiver (e.g., another base station, another UE, etc.). In the example of FIG. 5, a first base station 502-1 controls the reflective properties of an RIS 510 in order to communicate with a first UE 504-1.

The goal of RIS technology is to create smart radio environments, where the wireless propagation conditions are co-engineered with the physical layer signaling. This enhanced functionality of the system 500 can provide technical benefits in a number of scenarios.

As a first example scenario, as shown in FIG. 5, the first base station 502-1 (e.g., any of the base station described herein) is attempting to transmit downlink wireless signals to the first UE 504-1 and a second UE 504-2 (e.g., any two of the UEs described herein, collectively, UEs 504) on a plurality of downlink transmit beams, labeled "0," "1," "2," and "3." However, unlike the second UE 504-2, because the first UE 504-1 is behind an obstacle 520 (e.g., a building, a bill, or another type of obstacle), it cannot receive the wireless signal on what would otherwise be the line-of-sight (LOS) beam from the first base station 502-1, that is, the downlink transmit beam labeled "2." In this scenario, the first base station 502-1 may instead use the downlink transmit beam labeled "1" to transmit the wireless signal to the RIS 510, and configure the RIS 510 to reflect/beamform the incoming wireless signal towards the first UE 504-1. The first base station 502-1 can thereby transmit the wireless signal around the obstacle 520.

Note that the first base station 502-1 may also configure the RIS 510 for the first UE's 504-1 use in the uplink. In that case, the first base station 502-1 may configure the RIS 510 to reflect an uplink signal from the first UE 504-1 to the first base station 502-1, thereby enabling the first UE 504-1 to transmit the uplink signal around the obstacle 520.

As another example scenario in which system 500 can provide a technical advantage, the first base station 502-1 may be aware that the obstacle 520 may create a "dead zone," that is, a geographic area in which the downlink wireless signals from the first base station 502-1 are too attenuated to be reliably detected by a UE within that area (e.g., the first UE 504-1). In this scenario, the first base station 502-1 may configure the RIS 510 to reflect downlink wireless signals into the dead zone in order to provide coverage to UEs that may be located there, including UEs about which the first base station 502-1 is not aware.

An RIS (e.g., RIS 510) may be designed to operate in either a first mode (referred to as "Mode 1"), in which the RIS operates as a reconfigurable mirror, or a second mode (referred to as "Mode 2"), in which the RIS operates as a receiver and transmitter (similar to the amplify and forward functionality of a relay node). Some RIS may be designed to be able to operate in either Mode 1 or Mode 2, while other RIS may be designed to operate only in either Mode 1 or Mode 2. Mode 1 RIS are assumed to have a negligible hardware group delay, whereas Mode 2 RIS have a non-negligible hardware group delay due to being equipped with baseband processing capability. Because of their greater processing capability compared to Mode 1 RIS, Mode 2 RIS may, in some cases, be able to compute and report their transmission-to-reception (Tx-Rx) time difference measurements (i.e., the difference between the time a signal is forwarded to a UE and the time the signal is received back from the UE). In the example of FIG. 5, the RIS 510 may be either a Mode 1 or Mode 2 RIS.

FIG. 5 also illustrates a second base station 502-2 that may transmit downlink wireless signals to one or both of the UEs 504. As an example, the first base station 502-1 may be a serving base station for the UEs 504 and the second base station 502-2 may be a neighboring base station. The second base station 502-2 may transmit downlink positioning reference signals to one or both of the UEs 504 as part of a positioning procedure involving the UE(s) 504. Alternatively or additionally, the second base station 502-2 may be a secondary cell for one or both of the UEs 504. In some cases, the second base station 502-2 may also be able to reconfigure the RIS 510, provided it is not being controlled by the first base station 502-1 at the time.

Note that while FIG. 5 illustrates one RIS 510 and one base station controlling the RIS 510 (i.e., the first base station 502-1), the first base station 502-1 may control multiple RIS 510. In addition, the RIS 510 may be controlled by multiple base stations 502 (e.g., both the first and second base stations 502-1 and 502-2, and possibly more).

Figure 6:
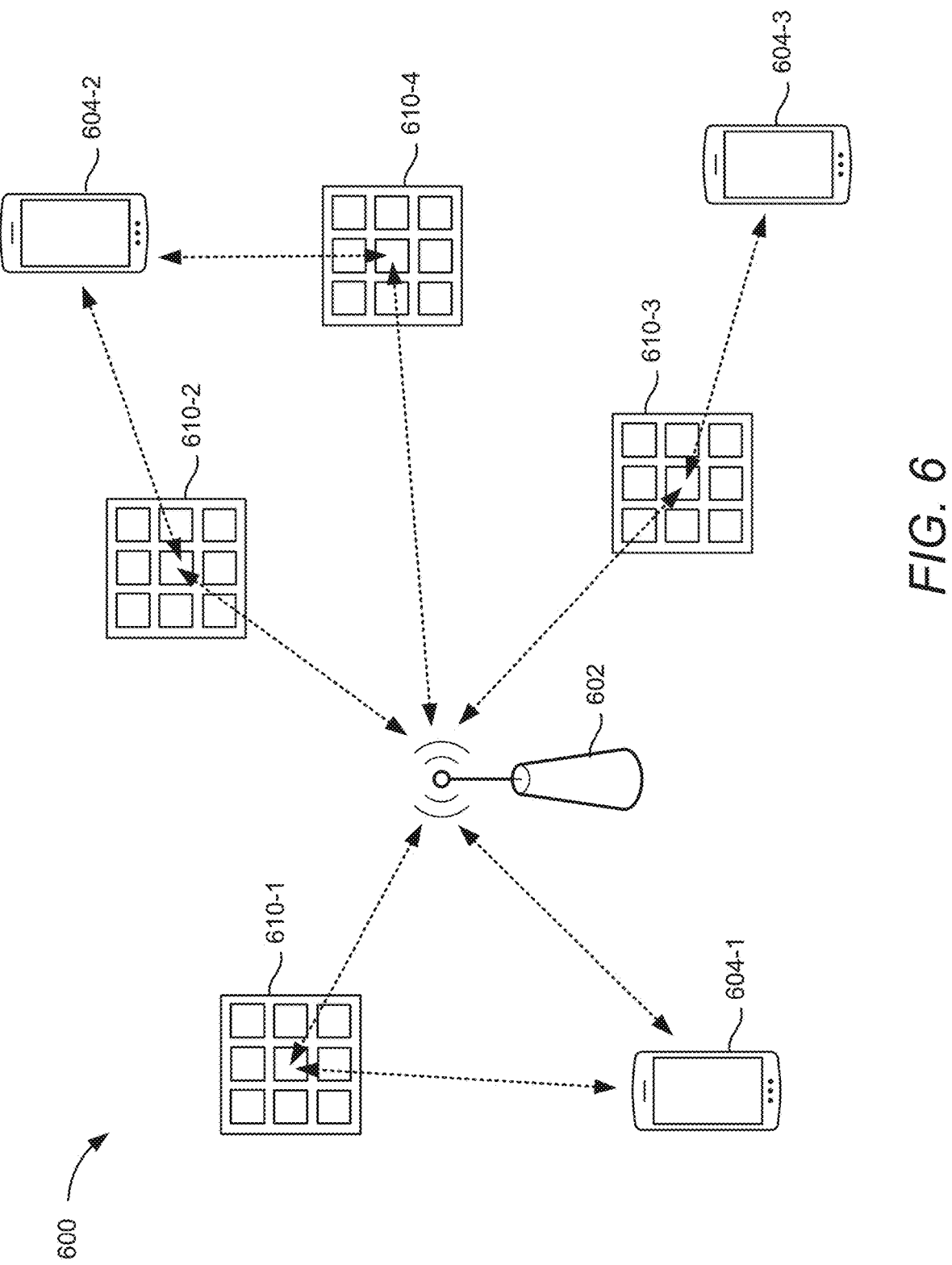
FIG. 6 illustrates an example system for wireless communication using multiple RIS 610, according to aspects of the disclosure.

FIG. 6 illustrates an example system 600 for wireless communication using multiple RIS 610, according to aspects of the disclosure. In the example of FIG. 6, instead of having one or a few larger RIS (as in the example system 500 of FIG. 5 with one RIS 510), there may be a larger number of distributed RIS, possibly having smaller form factors. For example, larger RIS may be 5×5 meters or incorporated into the side of a building, whereas smaller RIS may be 2×2 or 1×2 meters, similar to the size of a MIMO antenna. FIG. 6 illustrates four RIS 610 (specifically, RIS 610-1, RIS 610-2, RIS 610-3, RIS 610-4) distributed around a single base station 602 (e.g., any of the base stations described herein). The base station 602 may be serving three UEs 604 (specifically, UE 604-1, UE 604-2, and UE 604-3), which may correspond to any of the UEs described herein.

The base station 602 may control the reflective properties of the RIS 610 in order to communicate with the UEs 604. For example, the base station 602 may communicate with the UE 604-3 solely by means of RIS 610-3. Similarly, the base station 602 may communicate with the UE 604-2 by means of one or both of RIS 610-2 and 610-4. In contrast, the base station 02 may communicate with the UE 604-1 directly and/or via the RIS 610-1. As also illustrated in FIG. 6, a UE 604 can be associated with one or more RIS 610. For example, the UE 604-2 may communicate with the base station 602 via one or both of RIS 610-2 and 610-4.

As will be appreciated, compared to having one or a few larger RIS (as in FIG. 5), a system in which there are a larger number of (smaller) distributed RIS (as in FIG. 6) offers better spatial transmission/reception diversity from the perspective of the UE. However, such a system may also create a noisier environment.

Note that while FIG. 6 illustrates three UEs 604 and four RIS 610 in communication with the base station 602, as will be appreciated, there may be more or fewer UEs 604 and RIS 610 than the three and four, respectively, that are illustrated.

Figure 7:
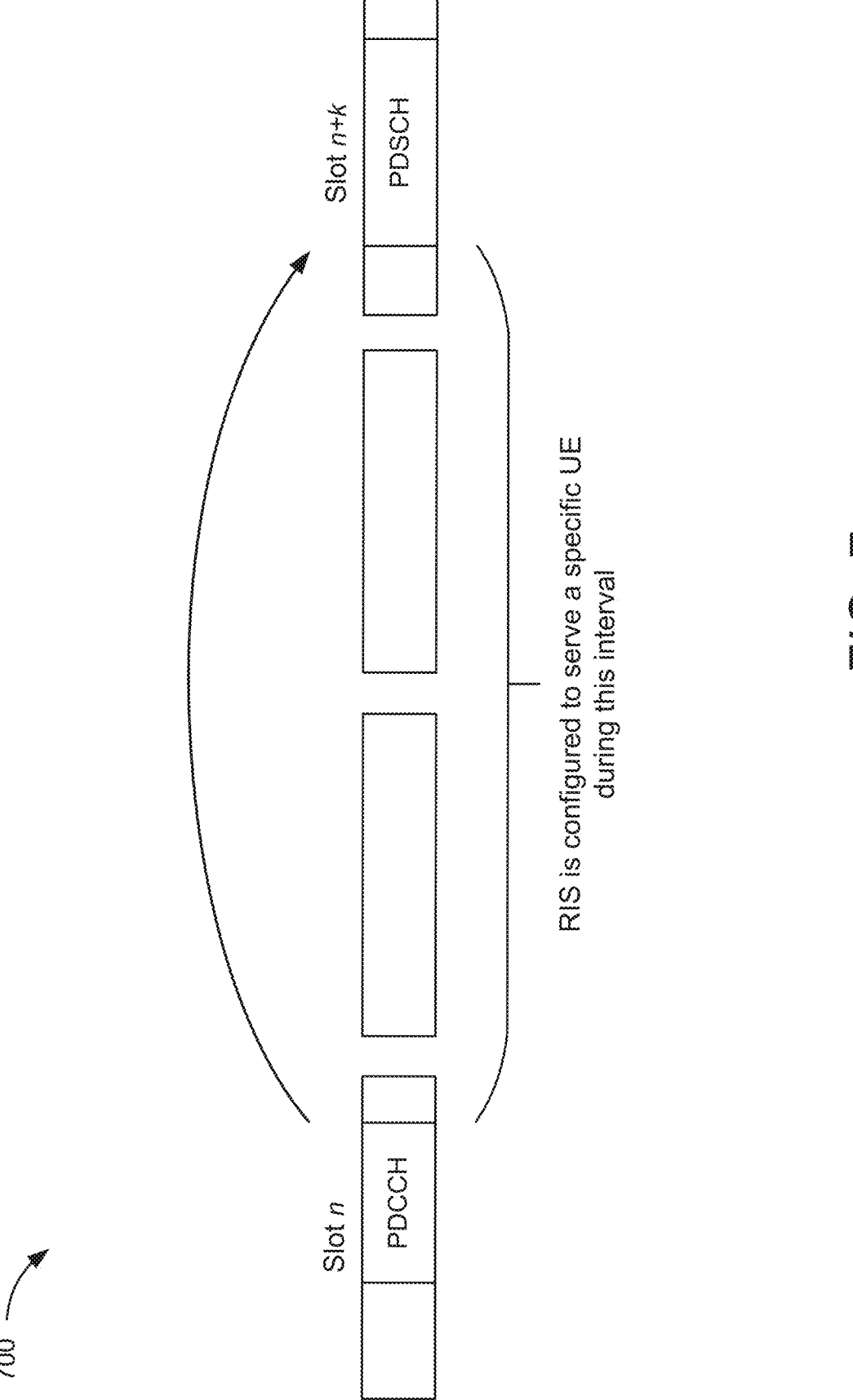
FIG. 7 is a diagram illustrating an example of how an RIS may be controlled via wireless downlink signaling, according to aspects of the disclosure.

An RIS may be controlled via a wired interface or a wireless interface. FIG. 7 is a diagram 700 illustrating an example of how an RIS may be controlled via wireless downlink signaling, according to aspects of the disclosure. In the example of FIG. 7, time is represented horizontally and each block represents a slot. In the example of FIG. 7, a base station transmits a PDCCH in slot n to serve two purposes: (1) configure the phase for each RIS element (i.e., each reflecting element) of an RIS and (2) schedule a downlink grant (a PDSCH) for a particular UE for slot n+k. Between slots n and n+k, the RIS is configured to serve the specific UE. That is, the phase of its reflecting elements is configured to reflect downlink signals from the base station to the UE, and possibly uplink signals from the UE to the base station. If k is large, then all of the time/frequency RIS resources between the PDCCH and the PDSCH are wasted.

Figure 8:
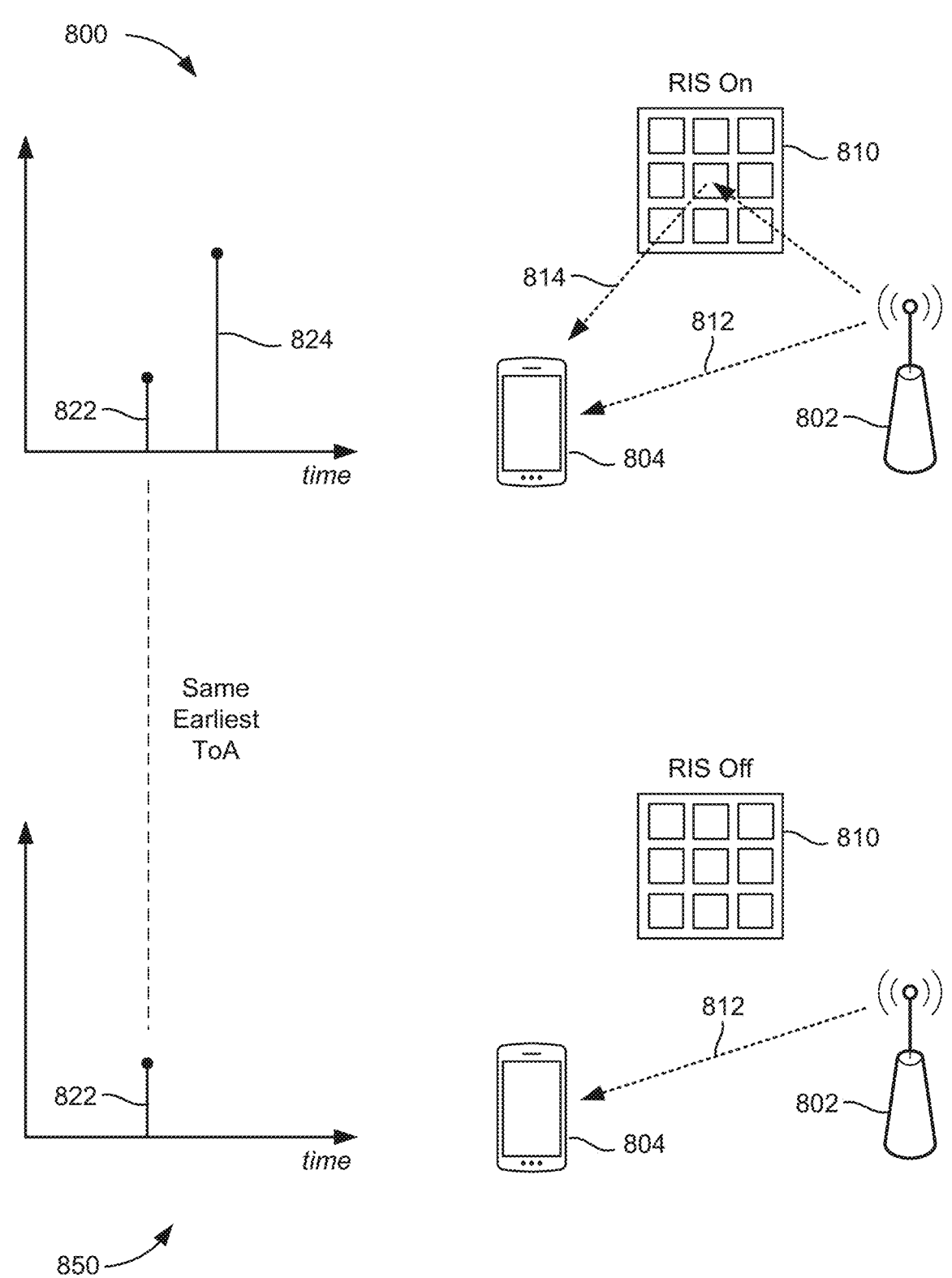
FIG. 8 illustrates two example scenarios for wireless positioning using an RIS, according to aspects of the disclosure.

It would be preferable for RIS-aided positioning to be supported in a UE-transparent manner. FIG. 8 illustrates two example scenarios for wireless positioning using an RIS 810, according to aspects of the disclosure. In FIG. 8, a base station 802 (e.g., any of the base stations described herein) is controlling an RIS 810 (e.g., any of the RIS described herein) and transmitting PRS to a UE 804 (e.g., any of the UEs described herein).

FIG. 8 illustrates two scenarios for the transmission of PRS resources from the base station 802 to the UE 804. In scenario 800, the RIS 810 is "on" (i.e., reflecting PRS resources towards the UE 804) and the UE 804 will receive two main paths for PRS transmissions from the base station 802. Specifically, the UE 804 will receive PRS resources directly from the base station 802 on path 812 and reflected PRS resources from the RIS 810 on path 814. In scenario 850, the RIS 810 is "off" (i.e., not reflecting the PRS resource towards the UE 804) and the UE will therefore receive a single main path for PRS transmissions from the base station 802. As illustrated in FIG. 8, the earliest ToA is the same in both scenarios. Specifically, the earliest ToA in both scenario 800 and scenario 850 is the ToA of path 812 at peak 822.

In the example of FIG. 8, the peak 822 for the path 812 is weaker (represented by the shorter vertical line) than the peak 824 for the path 814 (represented by the taller vertical line). This may be due to some blockage between the UE 804 and the base station 802 or to the greater distance between the UE 804 and the base station 802.

As a first approach for supporting RIS-aided positioning in a UE-transparent manner, a single PRS ID may be associated with a single PRS resource. Thus, in scenario 800, a PRS resource received on path 812 directly from the base station 802 will have the same PRS ID as the PRS resource received on path 814 reflected from the RIS 810. In this approach, the UE 804 would report information related to the multipath and timestamp for the PRS resource, without knowing whether one path (path 814) is a reflection from the RIS 810. The network, however, would know when the RIS 810 was "on," and can therefore associate the UE's 804 multipath report to the RIS' 810 on/off channel profile. That is, the network (e.g., location server, serving base station) can determine whether the RIS 810 was "on" when the UE 804 was measuring the PRS resource, and if it was, determine that one of the reported multipaths (path 814) is from the RIS 810.

There are various drawbacks to this approach. For example, UE-based positioning (where the UE 804 calculates its location using information from the network) is not inherently supported because each PRS resource is associated with a single geographic transmission point (there is no support for a single PRS resource to be associated with two transmitter locations). In addition, the UE 804 cannot exploit large-scale statistics consistently across measurements since the RIS' 810 on/off status is unknown, resulting to suboptimal peak detection. Further, the UE 804 does not receive assistance data with multiple expected search windows to help with the UE's 804 detection of both peaks 822 and 824.

In a second approach for supporting RIS-aided positioning in a UE-transparent manner, a single PRS ID may be associated with two PRS resources. The base station 802 may transmit the first PRS resource when the RIS 810 is "on" and the second PRS resource when the RIS 810 is "off." As in the first approach, the UE 804 reports information related to multipath and timestamp for the received PRS resource (whether the first or the second). The network would know which PRS resource corresponds to which RIS state, and can associate the UE's 804 multipath report to the RIS' 810 on/off channel profile.

There are also various drawbacks to this approach. For example, the received power delay profile (PDP) of the two PRS resources would have a strong correlation (insofar as the earliest ToA would be the same between them), and there is currently no signaling to provide this association to the UE 804. In addition, for UE-based positioning, the currently supported assistance data already allows the network to configure a separate location for each PRS resource (e.g., each PRS resource may be associated with a different TRP). However, this is not helpful in this approach (in comparison to a distributed antenna system (DAS) scenario), since the RIS "on" PRS resource still has the same earliest ToA as the RIS "off" PRS resource, and therefore the same transmission point.

The present disclosure provides techniques to enhance positioning assistance data signaling to account for the presence of RIS. As a first technique, a PRS resource may be associated with multiple antenna point locations (as noted above, a PRS resource is currently associated with a single transmission point). That is, each PRS resource configuration in the assistance data (e.g., from the location server) for a positioning session may include an association between the PRS resource and multiple transmission point locations, including the location of the TRP actually transmitting the PRS resource. More specifically, in addition to the location of the TRP transmitting the PRS resource (as is currently supported), the signaling framework may be general enough to enable associating a PRS resource with a controllable or non-controllable reflection location and/or a reflection with a known or unknown location.

Referring to controllable or non-controllable reflection locations, these may be the known locations of RIS or other reflectors that have been identified in the environment (e.g., mirrors, windows, steel walls, etc.). With respect to the RIS, the network may or may not be able to control a RIS' reflection direction, either because the RIS is static or the network cannot control that particular RIS for some reason (e.g., because it belongs to a different network). In either case, the location of the RIS is known to the network and can be included in the assistance data. With respect to the other reflectors, these cannot be controlled by the network and may have been identified in the environment via crowdsourcing. Referring to reflectors with unknown locations, these may be RIS with unknown locations (due, e.g., to being associated with a different network) or another mappable reflection that has been identified in the environment (e.g., via crowdsourcing) but whose location is not known.

Such a generic signaling framework can be enabled by providing a list of reflection point objects (RPO) in the assistance data for each PRS resource. Each RPO may be associated with an RPO-ID and a point location (i.e., the geographic location, if known, of the reflection point). Thus, for a PRS resource location in positioning assistance data, in addition to the antenna reference point (ARP) location field for the geographic location of the TRP transmitting the PRS resource, there would be one or more ARP reflection location fields for the known geographic location(s) of reflector(s) in the UE's environment (e.g., RIS or other reflectors that have been identified in the environment).

Figure 9:
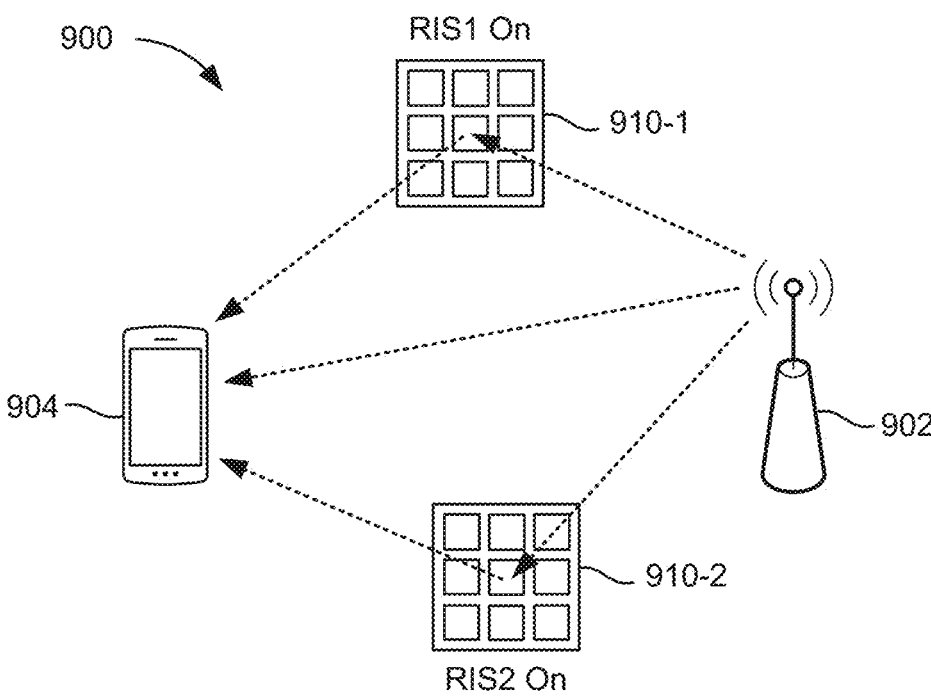
FIG. 9 illustrates an example system for wireless communication having multiple RIS, according to aspects of the disclosure.

FIG. 9 illustrates an example system 900 for wireless communication having multiple RIS 910, according to aspects of the disclosure. Specifically, FIG. 9 illustrates two RIS 910, a first RIS 910-1 (labeled "RIS1") and a second RIS 910-2 (labeled "RIS2"). FIG. 9 also illustrates a base station 902 (e.g., any of the base stations described herein) serving a UE 904 (e.g., any of the UEs described herein). In the example of FIG. 9, the base station 902 is able to control the reflective properties of the RIS 910 in order to communicate with the UE 904. In addition, the locations of the RIS 910 are known to the network.

As shown in FIG. 9, both RIS 910 are "on." As such, the PRS transmitted by the base station 902 are reflected by the RIS 910 towards the UE 904. In this scenario, for the above technique, the positioning assistance data (e.g., from the location server or the base station 902) will include an ARP location field for the location of the base station 902, a first ARP reflection location field for the location of the RIS 910-1, and a second ARP reflection location field for the location of the RIS 910-2. Note that even if the reflection directions of the RIS 910 were not controllable by the network (e.g., base station 902), because their locations are known, the assistance data would still include their locations in ARP reflection location fields.

Note that the terms "reflection point object" and "RPO" may refer to the physical reflector or the RPO information about the physical reflector.

As a second technique to enhance positioning assistance data signaling to account for the presence of RIS (and other reflectors), the positioning assistance data may include a collection of reflection point objects (RPOs), where each RPO would include the following parameters: an RPO-ID (which may be an index value in this technique), a geographic location, and, optionally, a specific frequency band and/or frequency range of applicability. In this scenario, the ARP field of a PRS resource could include (or otherwise be associated with) one or more RPO-IDs pointing to the associated RPO (and an RPO-ID may be associated with one or more PRS resources). The RPO information (without any association to PRS resources, PRS resource sets, positioning frequency layers, and/or TRPs) may be sent to the UE in separate signaling. For example, a base station may broadcast the RPOs in one or more positioning SIBs (posSIBs). Alternatively, a base station may transmit the RPO information to a UE in one or more RRC or MAC control element (MAC-CE) messages. As another alternative, the location server may send the RPO information to a UE in one or more LPP messages.

Referring back to FIG. 9, for the above technique, the UE 904 would receive the RPO information at some point before or during the positioning session. The RPO information would include a first RPO for the RIS 910-1 and a second RPO for the RIS 910-2. Each RPO would include an RPO-ID (e.g., index value), a geographic location, and, optionally, specific frequency band and/or frequency range of applicability for the respective RIS 910. For example, RIS 910-1 may operate in FR1 and RIS 910-2 may operate in FR2.

Still referring to FIG. 9, the positioning assistance data (e.g., from the location server or the base station 902) will include an ARP location field for the location of the base station 902, a first ARP reflection location field for the RPO of the RIS 910-1, and a second ARP reflection location field for the RPO of the RIS 910-2. That is, instead of each ARP reflection location field including the geographic location of the respective RIS 910, as in the first technique, each ARP reflection location field would include the RPO-ID of the respective RIS 910. Note that even if the reflection directions of the RIS 910 were not controllable by the network (e.g., base station 902), because their locations are known, the RPO information would still include their locations.

As described above, the network may be able to configure/control the reflection direction of an RIS. This should be accounted for in the positioning assistance data. As a first option, multiple RPOs can be defined that would each have different RPO-IDs but the same geographic location and operating band/frequency range. Each of the different RPO-IDs would be associated with a different reflection direction of the RIS.

Figure 10A:
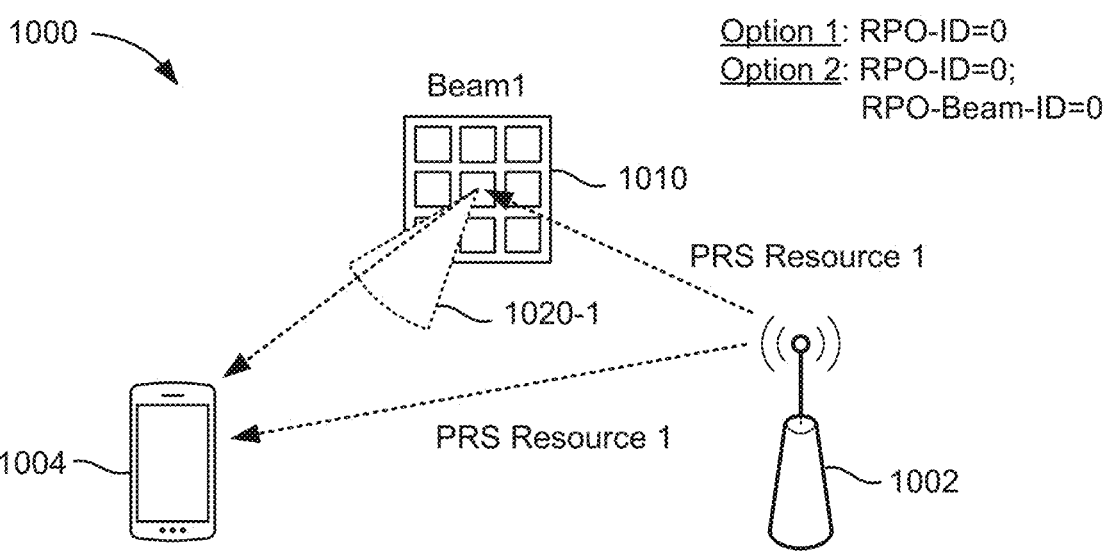
FIGS. 10A to 10C illustrate an example system for wireless communication using an RIS 1010, according to aspects of the disclosure.
Figure 10B:
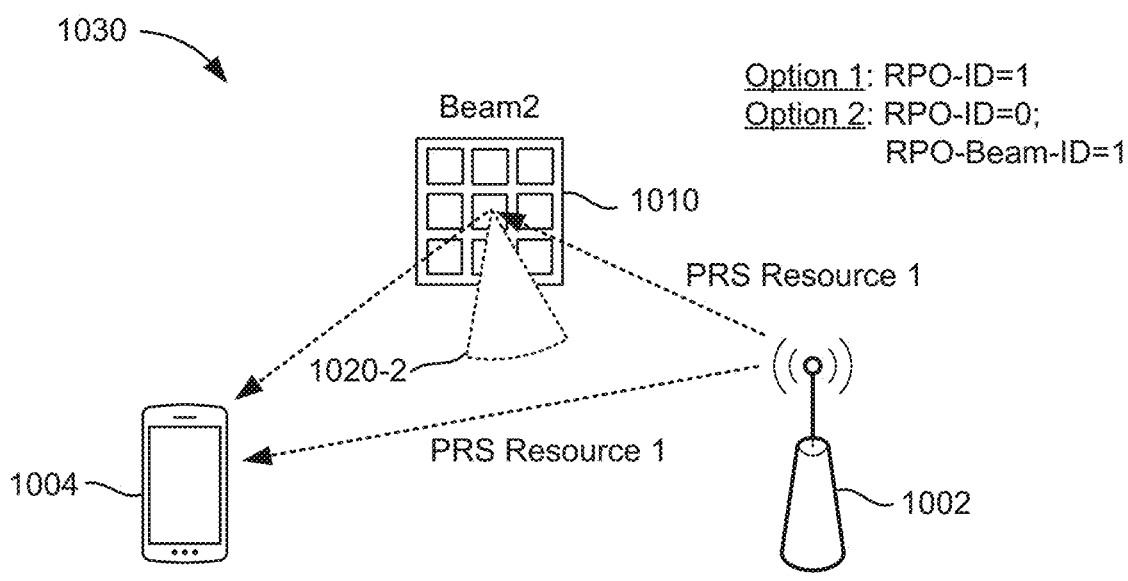
Figure 10C:
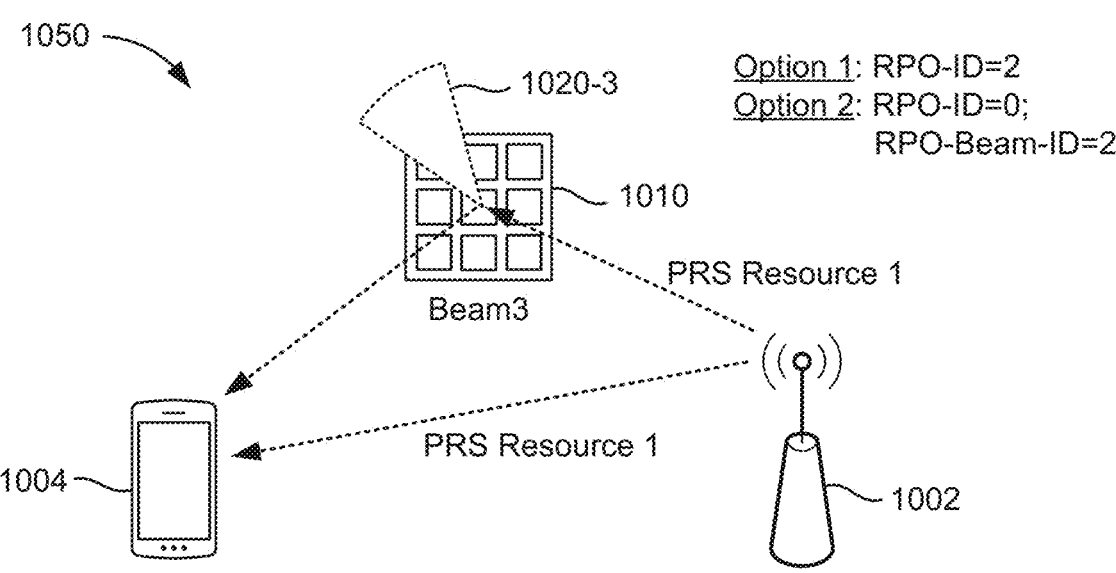

FIGS. 10A to 10C illustrate an example system for wireless communication using an RIS 1010, according to aspects of the disclosure. Specifically, FIGS. 10A to 10C illustrate a base station 1002 (e.g., any of the base stations described herein) serving a UE 1004 (e.g., any of the UEs described herein) and controlling a RIS 1010 (e.g., any of the RIS described herein). That is, the base station 1002 is able to control the reflective properties of the RIS 1010 in order to communicate with the UE 1004. In addition, the location of the RIS 1010 is known to the network.

In diagram 1000 of FIG. 10A, the base station 1002 transmits a PRS resource (labelled "PRS resource 1") towards the UE 1004 and the RIS 1010, and additionally configures the RIS 1010 to reflect the PRS resource in a first direction on a first beam 1020-1 (labeled "Beam1"). In diagram 1030 of FIG. 10B, the base station 1002 transmits the PRS resource towards the UE 1004 and the RIS 1010, and additionally configures the RIS 1010 to reflect the PRS resource in a second direction on a second beam 1020-2 (labeled "Beam2"). In diagram 1050 of FIG. 10C, the base station 1002 transmits the PRS resource towards the UE 1004 and the RIS 1010, and additionally configures the RIS 1010 to reflect the PRS resource in a third direction on a second beam 1020-3 (labeled "Beam3").

In the example of FIG. 10A, for the first option described herein (labeled "Option 1"), the RPO-ID for the RIS 1010 when reflecting on beam 1020-1 is '0.' In the example of FIG. 10B, the RPO-ID for the RIS 1010 when reflecting on beam 1020-2 is '1.' In the example of FIG. 10C, the RPO-ID for the RIS 1010 when reflecting on beam 1020-3 is '2.' The remainder of the information associated with each RPO-ID would be the same. That is, the geographic location and operating frequency band/frequency range for each of RPO-IDs '0', '1,' and '2' would be the same, as each RPO-ID refers to a different beam of the same RIS 1010.

Note that while the base station 1002 maybe the entity configuring the reflection direction of the RIS 1010, it need not be. The network simply needs to know the different reflection directions of the RIS 1010 that could be configured in order to provide the RPO information to the UE 1004.

As a second option to account for the configurability of the reflection direction of an RIS, each RPO may associated with an RPO-ID and an RPO-Beam-Set. The RPO-Beam-Set may include a list of RPO-Beam-IDs (e.g., index values), each corresponding to a different transmission filter (or reception/transmission filter), that is, a transmit beam, of a controllable RIS. A combination of an RPO-ID and an RPO-Beam-ID would therefore correspond to a unique, controllable reflection direction with a unique transmit spatial filter (or transmit/receive spatial filter), that is, a transmit beam. If an RPO is not controllable (i.e., the direction of the RIS reflection cannot be controlled, or the RPO is not an RIS), then an RPO would not contain any RPO-Beam-IDs and would be fully characterized by the RPO-ID and associated location.

Referring back to FIGS. 10A to 10C, for the second option (labeled "Option 2"), the RPO-ID for the RIS 1010 is '0.' In the example of FIG. 10A, the RPO-Beam-ID for beam 1020-1 is '0.' In the example of FIG. 10B, the RPO-Beam-ID for beam 1020-2 is '1.' In the example of FIG. 10C, the RPO-Beam-ID for beam 1020-3 is '2.' The different RPO-Beam-IDs would make up the RPO-Beam-Set for the RPO-ID=0. The RPO-ID would also include the geographic location and operating frequency band/frequency range for the RIS 1010.

For an RPO with an unknown location, location estimate information may be included in the RPO configuration. This may be based on crowdsourcing information from a plurality of UEs detecting reflections from the RPO.

In an aspect, there may be a flexible and dynamic association between PRS-IDs and RPO-IDs. More specifically, there may be a static (re)association (e.g., via an LPP Provide Assistance Data message at the beginning of the positioning session), a semi-static (re)association (e.g., via RRC and/or LPP signaling), or a dynamic (re)association (e.g., via MAC-CE and/or DCI) between a PRS-ID, PRS resource ID, PRS resource set ID, TRP ID, and/or positioning frequency layer and one or more RPO-IDs or RPO-Beam-IDs. Thus, depending on whether the association is static, semi-static, or dynamic, the association can be changed/reconfigured before or during a positioning session. A UE may receive a (re)association command from the serving base station or the location server (e.g., the location server associated with the RIS controller server).

Figure 11:
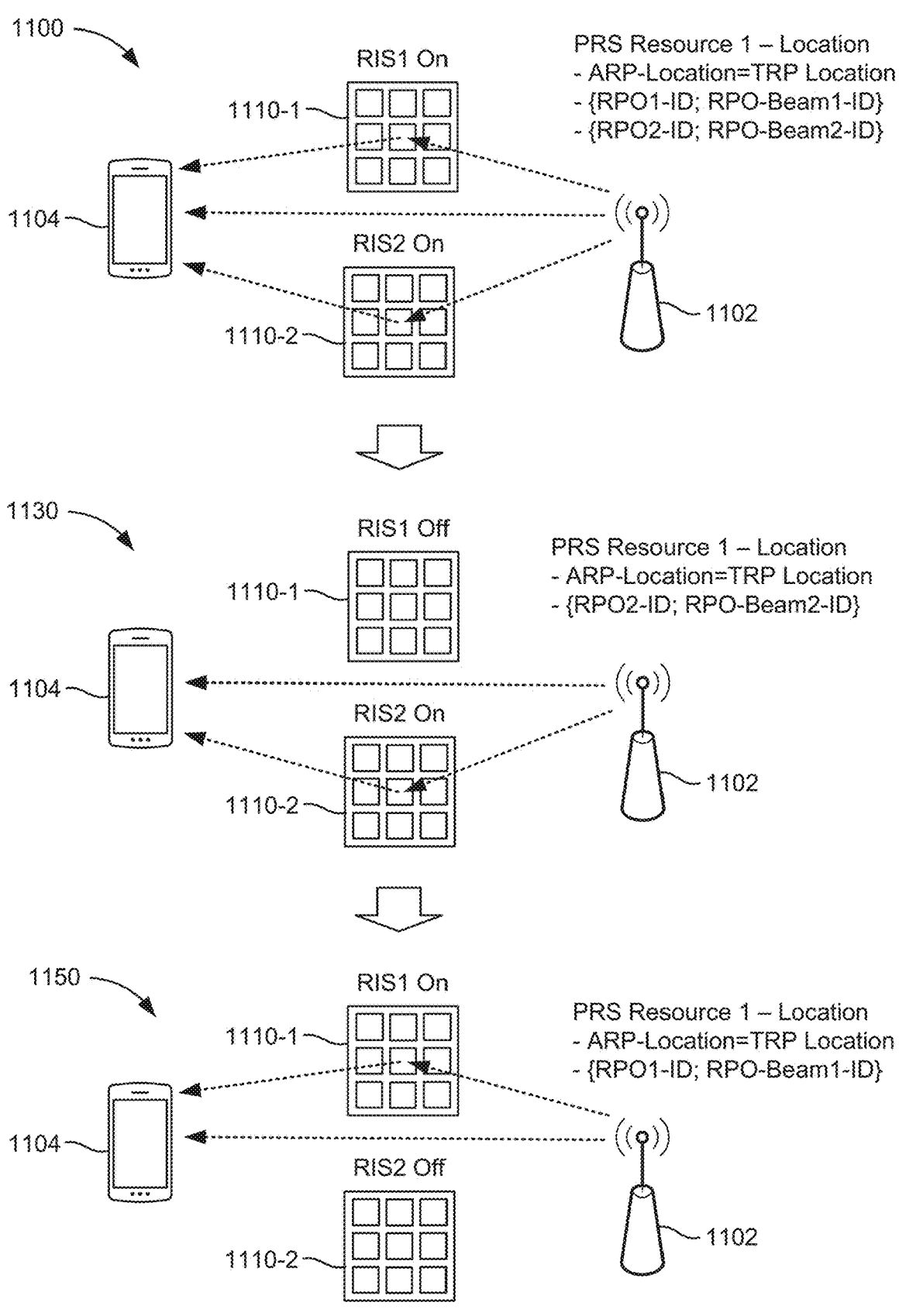
FIG. 11 illustrates an example system for wireless communication having multiple RIS 1110, according to aspects of the disclosure.

FIG. 11 illustrates an example system for wireless communication having multiple RIS 1110, according to aspects of the disclosure. Specifically, FIG. 11 illustrates two RIS 1110, a first RIS 1110-1 (labeled "RIS1") and a second RIS 1110-2 (labeled "RIS2"). FIG. 11 also illustrates a base station 1102 (e.g., any of the base stations described herein) serving a UE 1104 (e.g., any of the UEs described herein). In the example of FIG. 11, the base station 1102 is able to control the reflective properties of the RIS 1110 in order to transmit a PRS resource (labeled "PRS Resource 1") to the UE 1104. In addition, the locations of the RIS 1110 are known to the network.

As shown in diagram 1100, both RIS 1110 are "on." As such, the location information for the PRS resource (labeled "PRS Resource 1—Location") includes an ARP-Location field for the PRS resource (giving the location of the base station 1102, labeled "TRP Location"), an RPO-ID and RPO-Beam-ID for the first RIS 1110-1 (labeled "RPO1-ID" and "RPO-Beam1-ID," respectively), and an RPO-ID and RPO-Beam-ID for the second RIS 1110-2 (labeled "RPO2-ID" and "RPO-Beam2-ID," respectively).

As shown in diagram 1130, RIS 1110-1 has been turned "off" or is otherwise not transmitting towards, or not detectable by, the UE 1104. As such, the PRS resource location field is updated to include the RPO-ID ("RPO2-ID") and RPO-Beam-ID ("RPO-Beam2-ID") for only the second RIS 1110-2. The PRS resource location field may be updated by transmitting a whole new PRS resource location field (e.g., "PRS Resource 1—Location"), only the updated portion (e.g., "RPO2-ID" and "RPO-Beam2-ID"), an indication to ignore the RPO information for the first RIS 1110-1, an indication that only the RPO information for the second RIS 1110-2 is valid, or the like.

As shown in diagram 1150, RIS 1110-1 has been turned back "on" and RIS 1110-2 has been turned "off" or is otherwise not transmitting towards, or not detectable by, the UE 1104. As such, the PRS resource location field is updated to include the RPO-ID ("RPO1-ID") and RPO-Beam-ID ("RPO-Beam1-ID") for only the first RIS 1110-1. The PRS resource location field may be updated in the same way that the it is updated for the RIS 1110-1 being turned "off" and the RIS 1110-2 being turned "on" (diagram 1130).

FIG. 12 illustrates an example method 1200 of wireless positioning, according to aspects of the disclosure. In an aspect, method 1200 may be performed by a UE (e.g., any of the UEs described herein).

At 1210, the UE engages in a positioning session or a sensing session. The UE may request positioning assistance data in order to perform the positioning session. In an aspect, operation 1210 may be performed by WWAN transceiver 310, processing system 332, memory component 340, and/or positioning component 342, any or all of which may be considered means for performing this operation.

At 1220, the UE receives, from a network entity (e.g., location server, serving base station), assistance data for at least one PRS resource transmitted by a transmission point (e.g., TRP, base station, beacon transmitter, etc.), the assistance data including a PRS resource location field indicating a geographic location of the transmission point, the assistance data further including RPO information for at least one RPO that is capable of reflecting a waveform associated with the at least one PRS resource, the RPO information including at least location information for the at least one RPO. In an aspect, operation 1220 may be performed by WWAN transceiver 310, processing system 332, memory component 340, and/or positioning component 342, any or all of which may be considered means for performing this operation.

Within a "sensing" session, the location information for the at least one RPO may contain an approximate location or a target "search space" for the UE to start the sensing processing. This may be provided as uncertainty-region information. Within a positioning session, the location information for the at least one RPO may contain the actual location of the RPO (and possibly shape information, if it is not a "point reflector"). As such, the location may be in the format of longitude and latitude or (x, y, z) coordinates, possibly with respect to a reference point. The reference point may be the location of the transmission point, or it may be configured together with the assistance data that contains all the RPOs. If the location information contains shape information, this may be, for example, (x, y, z) coordinates of the corners of the shape and a shape identifier (e.g., a plane).

Figure 13:
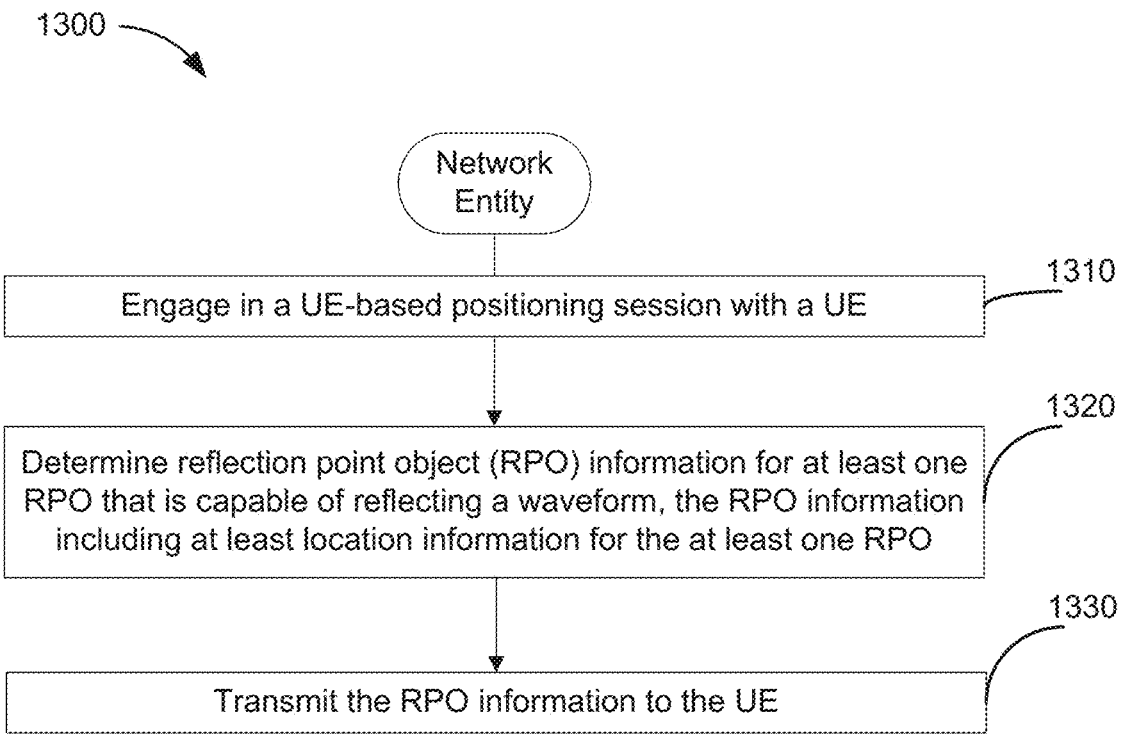

FIG. 13 illustrates an example method 1300 of wireless positioning, according to aspects of the disclosure. In an aspect, method 1300 may be performed by a network entity (e.g. any of the base stations described herein, location server 230, LMF 270, SLP 272).

At 1310, the network entity engages in a positioning session or a sensing session with a UE (e.g., any of the UEs described herein). In an aspect, where the network entity is a base station, operation 1310 may be performed by WWAN transceiver 350, processing system 384, memory component 386, and/or positioning component 388, any or all of which may be considered means for performing this operation. Where the network entity is a location server, operation 1310 may be performed by network interface 390, processing system 394, memory component 396, and/or positioning component 398, any or all of which may be considered means for performing this operation.

At 1320, the network entity determines RPO information for at least one RPO that is capable of reflecting a waveform, the RPO information including at least location information for the at least one RPO. In an aspect, where the network entity is a base station, operation 1320 may be performed by WWAN transceiver 350, processing system 384, memory component 386, and/or positioning component 388, any or all of which may be considered means for performing this operation. Where the network entity is a location server, operation 1320 may be performed by network interface 390, processing system 394, memory component 396, and/or positioning component 398, any or all of which may be considered means for performing this operation.

At 1330, the network entity transmits the RPO information to the UE. In an aspect, where the network entity is a base station, operation 1330 may be performed by WWAN transceiver 350, processing system 384, memory component 386, and/or positioning component 388, any or all of which may be considered means for performing this operation. Where the network entity is a location server, operation 1330 may be performed by network interface 390, processing system 394, memory component 396, and/or positioning component 398, any or all of which may be considered means for performing this operation.

As will be appreciated, technical advantages of the method 1200 include the enablement of the use of RIS for UE-based positioning and more accurate and robust estimation of the ToA of the earliest and multipath components in the case of UE-assisted positioning.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless positioning performed by a user equipment (UE), comprising: engaging in a positioning session or a sensing session; and receiving, from a network entity, assistance data for at least one positioning reference signal (PRS) resource transmitted by a transmission point, the assistance data including a PRS resource location field indicating a geographic location of the transmission point, the assistance data further including reflection point object (RPO) information for at least one RPO that is capable of reflecting a waveform associated with the at least one PRS resource, the RPO information including at least location information for the at least one RPO.

Clause 2. The method of clause 1, wherein a direction of reflections from the at least one RPO is controllable.

Clause 3. The method of clause 2, wherein the at least one RPO is a reconfigurable intelligent surface (RIS) connected to a wireless access network to which the network entity belongs.

Clause 4. The method of clause 1, wherein a direction of reflections from the at least one RPO is not controllable.

Clause 5. The method of clause 4, wherein the at least one RPO is an RIS not connected to a wireless access network to which the network entity belongs, a mirror, glass, metal, or other reflective object.

Clause 6. The method of any of clauses 1 to 5, wherein the location information for the at least one RPO is a geographic location of the at least one RPO.

Clause 7. The method of any of clauses 1 to 5, wherein: a geographic location of the at least one RPO is not known to the network entity, and the location information for the at least one RPO is an estimated location of the at least one RPO.

Clause 8. The method of any of clauses 1 to 7, wherein the PRS resource location field includes the geographic location of the transmission point and the location information for the at least one RPO.

Clause 9. The method of any of clauses 1 to 8, wherein: the RPO information further includes an RPO identifier, and the PRS resource location field includes the geographic location of the transmission point and the RPO identifier.

Clause 10. The method of clause 9, wherein the RPO information further includes a frequency band, a frequency range, or both in which the at least one RPO operates.

Clause 11. The method of any of clauses 1 to 10, further comprising: receiving the RPO information in broadcast information from a base station.

Clause 12. The method of clause 11, wherein the broadcast information comprises a positioning system information block (PosSIB).

Clause 13. The method of any of clauses 1 to 10, further comprising: receiving the RPO information in unicast information from a serving base station.

Clause 14. The method of any of clauses 1 to 13, further comprising: transmitting a request to the network entity for the RPO information.

Clause 15. The method of any of clauses 1 to 14, wherein: the RPO is an RIS, and the RIS is associated with a plurality of RPO identifiers, each of the plurality of RPO identifiers associated with a different direction of reflection from the RIS.

Clause 16. The method of any of clauses 1 to 14, wherein: the RPO is an RIS, and the RIS is associated with a single RPO identifier and a plurality of RPO beam identifiers, each of the plurality of RPO beam identifiers associated with a different direction of reflection from the RIS.

Clause 17. The method of any of clauses 1 to 16, wherein an association of an RPO identifier of the at least one RPO to the at least one PRS resource is configured statically.

Clause 18. The method of clause 17, wherein the association of the RPO identifier of the at least one RPO to the at least one PRS resource being configured statically comprises the assistance data being received via a Long-Term Evolution (LTE) positioning protocol (LPP) Provide Assistance Data message.

Clause 19. The method of any of clauses 1 to 16, wherein an association of an RPO identifier of the at least one RPO to the at least one PRS resource is configured semi-statically.

Clause 20. The method of clause 19, wherein the association of the RPO identifier of the at least one RPO to the at least one PRS resource being configured semi-statically comprises the assistance data being received via radio resource control (RRC), LPP, or both signaling.

Clause 21. The method of any of clauses 1 to 16, wherein an association of an RPO identifier of the at least one RPO to the at least one PRS resource is configured dynamically.

Clause 22. The method of clause 21, wherein the association of the RPO identifier of the at least one RPO to the at least one PRS resource being configured dynamically comprises the assistance data being received via medium access control control element (MAC-CE), downlink control information (DCI), or both.

Clause 23. A method of wireless positioning performed by a network entity, comprising: engaging in a positioning session or a sensing session with a user equipment (UE); determining reflection point object (RPO) information for at least one RPO that is capable of reflecting a waveform, the RPO information including at least location information for the at least one RPO; and transmitting the RPO information to the UE.

Clause 24. The method of clause 23, wherein the at least one RPO is a reconfigurable intelligent surface (RIS) connected to a wireless access network to which the network entity belongs.

Clause 25. The method of clause 23, wherein the at least one RPO is an RIS not connected to a wireless access network to which the network entity belongs, a mirror, glass, metal, or other reflective object.

Clause 26. The method of any of clauses 23 to 25, wherein the location information for the at least one RPO is a geographic location of the at least one RPO.

Clause 27. The method of any of clauses 23 to 25, wherein: a geographic location of the at least one RPO is not known to the network entity, and the location information for the at least one RPO is an estimated location of the at least one RPO.

Clause 28. The method of any of clauses 23 to 27, wherein: the RPO information further includes an RPO identifier, and the PRS resource location field includes a geographic location of the transmission point and the RPO identifier.

Clause 29. A user equipment (UE), comprising: a memory; a transceiver; and a processor communicatively coupled to the memory and the transceiver, the processor configured to: engage in a positioning session or a sensing session; and receive, via the transceiver, from a network entity, assistance data for at least one positioning reference signal (PRS) resource transmitted by a transmission point, the assistance data including a PRS resource location field indicating a geographic location of the transmission point, the assistance data further including reflection point object (RPO) information for at least one RPO that is capable of reflecting a waveform associated with the at least one PRS resource, the RPO information including at least location information for the at least one RPO.

Clause 30. The UE of clause 29, wherein a direction of reflections from the at least one RPO is controllable.

Clause 31. The UE of clause 30, wherein the at least one RPO is a reconfigurable intelligent surface (RIS) connected to a wireless access network to which the network entity belongs.

Clause 32. The UE of clause 29, wherein a direction of reflections from the at least one RPO is not controllable.

Clause 33. The UE of clause 32, wherein the at least one RPO is an RIS not connected to a wireless access network to which the network entity belongs, a mirror, glass, metal, or other reflective object.

Clause 34. The UE of any of clauses 29 to 33, wherein the location information for the at least one RPO is a geographic location of the at least one RPO.

Clause 35. The UE of any of clauses 29 to 33, wherein: a geographic location of the at least one RPO is not known to the network entity, and the location information for the at least one RPO is an estimated location of the at least one RPO.

Clause 36. The UE of any of clauses 29 to 35, wherein the PRS resource location field includes the geographic location of the transmission point and the location information for the at least one RPO.

Clause 37. The UE of any of clauses 29 to 36, wherein: the RPO information further includes an RPO identifier, and the PRS resource location field includes the geographic location of the transmission point and the RPO identifier.

Clause 38. The UE of clause 37, wherein the RPO information further includes a frequency band, a frequency range, or both in which the at least one RPO operates.

Clause 39. The UE of any of clauses 29 to 38, wherein processor is further configured to: receive, via the transceiver, the RPO information in broadcast information from a base station.

Clause 40. The UE of clause 39, wherein the broadcast information comprises a positioning system information block (PosSIB).

Clause 41. The UE of any of clauses 29 to 38, wherein the processor is further configured to: receive, via the transceiver, the RPO information in unicast information from a serving base station.

Clause 42. The UE of any of clauses 29 to 41, wherein the processor is further configured to: cause the transceiver to transmit a request to the network entity for the RPO information.

Clause 43. The UE of any of clauses 29 to 42, wherein: the RPO is an RIS, and the RIS is associated with a plurality of RPO identifiers, each of the plurality of RPO identifiers associated with a different direction of reflection from the RIS.

Clause 44. The UE of any of clauses 29 to 42, wherein: the RPO is an RIS, and the RIS is associated with a single RPO identifier and a plurality of RPO beam identifiers, each of the plurality of RPO beam identifiers associated with a different direction of reflection from the RIS.

Clause 45. The UE of any of clauses 29 to 44, wherein an association of an RPO identifier of the at least one RPO to the at least one PRS resource is configured statically.

Clause 46. The UE of clause 45, wherein the association of the RPO identifier of the at least one RPO to the at least one PRS resource being configured statically comprises the assistance data being received via a Long-Term Evolution (LTE) positioning protocol (LPP) Provide Assistance Data message.

Clause 47. The UE of any of clauses 29 to 44, wherein an association of an RPO identifier of the at least one RPO to the at least one PRS resource is configured semi-statically.

Clause 48. The UE of clause 47, wherein the association of the RPO identifier of the at least one RPO to the at least one PRS resource being configured semi-statically comprises the assistance data being received via radio resource control (RRC), LPP, or both signaling.

Clause 49. The UE of any of clauses 29 to 44, wherein an association of an RPO identifier of the at least one RPO to the at least one PRS resource is configured dynamically.

Clause 50. The UE of clause 49, wherein the association of the RPO identifier of the at least one RPO to the at least one PRS resource being configured dynamically comprises the assistance data being received via medium access control control element (MAC-CE), downlink control information (DCI), or both.

Clause 51. A network entity, comprising: a memory; a transceiver; and a processor communicatively coupled to the memory and the transceiver, the processor configured to: engage in a positioning session or a sensing session with a user equipment (UE); determine reflection point object (RPO) information for at least one RPO that is capable of reflecting a waveform, the RPO information including at least location information for the at least one RPO; and cause the transceiver to transmit the RPO information to the UE.

Clause 52. The network entity of clause 51, wherein the at least one RPO is a reconfigurable intelligent surface (RIS) connected to a wireless access network to which the network entity belongs.

Clause 53. The network entity of clause 51, wherein the at least one RPO is an RIS not connected to a wireless access network to which the network entity belongs, a mirror, glass, metal, or other reflective object.

Clause 54. The network entity of any of clauses 51 to 53, wherein the location information for the at least one RPO is a geographic location of the at least one RPO.

Clause 55. The network entity of any of clauses 51 to 53, wherein: a geographic location of the at least one RPO is not known to the network entity, and the location information for the at least one RPO is an estimated location of the at least one RPO.

Clause 56. The network entity of any of clauses 51 to 55, wherein: the RPO information further includes an RPO identifier, and the PRS resource location field includes a geographic location of the at least one RPO and the RPO identifier.

Clause 57. An apparatus comprising means for performing a method according to any of clauses 1 to 28.

Clause 58. A non-transitory computer-readable medium storing computer-executable instructions, the computer-executable comprising at least one instruction for causing a computer or processor to perform a method according to any of clauses 1 to 28.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless positioning performed by a user equipment (UE), comprising:
   engaging in a positioning session or a sensing session; and
   receiving, from a network entity, assistance data for at least one positioning reference signal (PRS) resource transmitted by a transmission point, the assistance data including a PRS resource location field indicating a geographic location of the transmission point, the assistance data further including reflection point object (RPO) information for at least one RPO that is capable of reflecting a waveform associated with the at least one PRS resource, the RPO information including at least location information for the at least one RPO, wherein the RPO information further includes an RPO identifier, and the PRS resource location field includes the geographic location of the transmission point and the RPO identifier, and wherein the RPO information further includes a frequency band, a frequency range, or both in which the at least one RPO operates.

2. The method of claim 1, wherein a direction of reflections from the at least one RPO is controllable.

3. The method of claim 2, wherein the at least one RPO is a reconfigurable intelligent surface (RIS) connected to a wireless access network to which the network entity belongs.

4. The method of claim 1, wherein a direction of reflections from the at least one RPO is not controllable.

5. The method of claim 4, wherein the at least one RPO is an RIS not connected to a wireless access network to which the network entity belongs, a mirror, glass, metal, or other reflective object.

6. The method of claim 1, wherein the location information for the at least one RPO is a geographic location of the at least one RPO.

7. The method of claim 1, further comprising:
receiving the RPO information in broadcast information from a base station.

8. The method of claim 7, wherein the broadcast information comprises a positioning system information block (PosSIB).

9. The method of claim 1, further comprising:
receiving the RPO information in unicast information from a serving base station.

10. The method of claim 1, further comprising:
transmitting a request to the network entity for the RPO information.

11. The method of claim 1, wherein:
the RPO is an RIS, and
the RIS is associated with a plurality of RPO identifiers, each of the plurality of RPO identifiers associated with a different direction of reflection from the RIS.

12. The method of claim 1, wherein:
the RPO is an RIS, and
the RIS is associated with a single RPO identifier and a plurality of RPO beam identifiers, each of the plurality of RPO beam identifiers associated with a different direction of reflection from the RIS.

13. The method of claim 1, wherein an association of an RPO identifier of the at least one RPO to the at least one PRS resource is configured statically.

14. The method of claim 13, wherein the association of the RPO identifier of the at least one RPO to the at least one PRS resource being configured statically comprises the assistance data being received via a Long-Term Evolution (LTE) positioning protocol (LPP) Provide Assistance Data message.

15. The method of claim 1, wherein an association of an RPO identifier of the at least one RPO to the at least one PRS resource is configured semi-statically.

16. The method of claim 15, wherein the association of the RPO identifier of the at least one RPO to the at least one PRS resource being configured semi-statically comprises the assistance data being received via radio resource control (RRC), LPP, or both signaling.

17. The method of claim 1, wherein an association of an RPO identifier of the at least one RPO to the at least one PRS resource is configured dynamically.

18. The method of claim 17, wherein the association of the RPO identifier of the at least one RPO to the at least one PRS resource being configured dynamically comprises the assistance data being received via medium access control control element (MAC-CE), downlink control information (DCI), or both.

19. A method of wireless positioning performed by a user equipment (UE), comprising:
engaging in a positioning session or a sensing session; and
receiving, from a network entity, assistance data for at least one positioning reference signal (PRS) resource transmitted by a transmission point, the assistance data including a PRS resource location field indicating a geographic location of the transmission point, the assistance data further including reflection point object (RPO) information for at least one RPO that is capable of reflecting a waveform associated with the at least one PRS resource, the RPO information including at least location information for the at least one RPO, wherein:
a geographic location of the at least one RPO is not known to the network entity, and
the location information for the at least one RPO is an estimated location of the at least one RPO.

20. The method of claim 1, wherein the PRS resource location field includes the geographic location of the transmission point and the location information for the at least one RPO.

21. A method of wireless positioning performed by a network entity, comprising:
engaging in a positioning session or a sensing session with a user equipment (UE);
determining reflection point object (RPO) information for at least one RPO that is capable of reflecting a waveform, the RPO information including at least location information for the at least one RPO, wherein the RPO information further includes an RPO identifier, and wherein the RPO information further includes a frequency band, a frequency range, or both in which the at least one RPO operates; and
transmitting the RPO information to the UE.

22. The method of claim 21, wherein the at least one RPO is a reconfigurable intelligent surface (RIS) connected to a wireless access network to which the network entity belongs.

23. The method of claim 21, wherein the at least one RPO is an RIS not connected to a wireless access network to which the network entity belongs, a mirror, glass, metal, or other reflective object.

24. The method of claim 21, wherein the location information for the at least one RPO is a geographic location of the at least one RPO.

25. The method of claim 21, wherein:
a geographic location of the at least one RPO is not known to the network entity, and
the location information for the at least one RPO is an estimated location of the at least one RPO.

26. A user equipment (UE), comprising:
a memory;
at least one transceiver; and
at least one processor communicatively coupled to the memory and the at least one transceiver, the at least one processor configured to:
engage in a positioning session or a sensing session; and
receive, via the at least one transceiver, from a network entity, assistance data for at least one positioning reference signal (PRS) resource transmitted by a transmission point, the assistance data including a PRS resource location field indicating a geographic location of the transmission point, the assistance data further including reflection point object (RPO) information for at least one RPO that is capable of reflecting a waveform associated with the at least one PRS resource, the RPO information including at least location information for the at least one RPO, wherein the RPO information further includes an RPO identifier, and the PRS resource location field includes the geographic location of the transmission point and the RPO identifier, and wherein the RPO information further includes a frequency band, a frequency range, or both in which the at least one RPO operates.

27. The UE of claim 26, wherein a direction of reflections from the at least one RPO is controllable.

28. The UE of claim 26, wherein a direction of reflections from the at least one RPO is not controllable.

29. The UE of claim 26, wherein the location information for the at least one RPO is a geographic location of the at least one RPO.

30. The UE of claim 26, wherein the PRS resource location field includes the geographic location of the transmission point and the location information for the at least one RPO.

31. A user equipment (UE), comprising:

a memory;

at least one transceiver; and at least one processor communicatively coupled to the memory and the at least one transceiver, the at least one processor configured to:

engage in a positioning session or a sensing session; and receive, via the at least one transceiver, from a network entity, assistance data for at least one positioning reference signal (PRS) resource transmitted by a transmission point, the assistance data including a PRS resource location field indicating a geographic location of the transmission point, the assistance data further including reflection point object (RPO) information for at least one RPO that is capable of reflecting a waveform associated with the at least one PRS resource, the RPO information including at least location information for the at least one RPO, wherein:

a geographic location of the at least one RPO is not known to the network entity, and the location information for the at least one RPO is an estimated location of the at least one RPO.

32. A network entity, comprising:

a memory;

at least one transceiver; and at least one processor communicatively coupled to the memory and the at least one transceiver, the at least one processor configured to:

engage in a positioning session or a sensing session with a user equipment (UE);

determine reflection point object (RPO) information for at least one RPO that is capable of reflecting a waveform, the RPO information including at least location information for the at least one RPO, wherein the RPO information further includes an RPO identifier, and wherein the RPO information further includes a frequency band, a frequency range, or both in which the at least one RPO operates; and cause the at least one transceiver to transmit the RPO information to the UE.

33. The network entity of claim 32, wherein the at least one RPO is a reconfigurable intelligent surface (RIS) connected to a wireless access network to which the network entity belongs.

34. The network entity of claim 32, wherein the at least one RPO is an RIS not connected to a wireless access network to which the network entity belongs, a mirror, glass, metal, or other reflective object.

35. The network entity of claim 32, wherein the location information for the at least one RPO is a geographic location of the at least one RPO.

36. The network entity of claim 32, wherein:

a geographic location of the at least one RPO is not known to the network entity, and the location information for the at least one RPO is an estimated location of the at least one RPO.

* * * * *